US010791481B2

(12) United States Patent
Nguyen et al.

(10) Patent No.: US 10,791,481 B2
(45) Date of Patent: Sep. 29, 2020

(54) DUAL CONNECTIVITY

(71) Applicant: AltioStar Networks, Inc., Tewksbury, MA (US)

(72) Inventors: Si Nguyen, Winchester, MA (US); Shabbir A. Bagasrawala, Lexington, MA (US)

(73) Assignee: AltioStar Networks, Inc., Tewksbury, MA (US)

( * ) Notice: Subject to any disclaimer, the term of this patent is extended or adjusted under 35 U.S.C. 154(b) by 0 days.

(21) Appl. No.: 15/483,038

(22) Filed: Apr. 10, 2017

(65) Prior Publication Data
US 2017/0295517 A1    Oct. 12, 2017

Related U.S. Application Data

(60) Provisional application No. 62/320,146, filed on Apr. 8, 2016.

(51) Int. Cl.
*H04W 28/08*    (2009.01)
*H04L 5/00*    (2006.01)
(Continued)

(52) U.S. Cl.
CPC ........... *H04W 28/08* (2013.01); *H04L 5/0055* (2013.01); *H04W 8/22* (2013.01);
(Continued)

(58) Field of Classification Search
None
See application file for complete search history.

(56) References Cited

U.S. PATENT DOCUMENTS

| 5,923,650 A | 7/1999 | Chen et al. |
| 8,531,947 B2 | 9/2013 | Zhao et al. |

(Continued)

FOREIGN PATENT DOCUMENTS

| CN | 101379839 A | 3/2009 |
| CN | 102396262 A | 3/2012 |

(Continued)

OTHER PUBLICATIONS

International Search Report and Written Opinion for Application No. PCT/US2017/026793 dated Aug. 18, 2017.

(Continued)

*Primary Examiner* — Yaotang Wang
(74) *Attorney, Agent, or Firm* — Mintz Levin Cohn Ferris Glovsky and Popeo, P.C.

(57) ABSTRACT

A system, a method, an apparatus, and a computer program product for transmission of data packets using dual connectivity in wireless communications system. A packet data convergence protocol (PDCP) window is transmitted from a first base station to a second base station. A first time for a successful transmission of a data packet from the first base station to a user equipment is determined. An acknowledgement of a successful transmission of the data packet from the second base station to the user equipment is received. The second base station determines a second time for the successful transmission of the data packet from the second base station to the user equipment based on the received PDCP window. Based on a comparison of the first and second times, a base station to process at least another data packet is determined.

36 Claims, 19 Drawing Sheets

(51) Int. Cl.
*H04W 8/22* (2009.01)
*H04W 72/04* (2009.01)
*H04W 72/12* (2009.01)
*H04W 84/04* (2009.01)
*H04W 88/08* (2009.01)
*H04W 92/20* (2009.01)

(52) U.S. Cl.
CPC ... *H04W 72/0426* (2013.01); *H04W 72/1273* (2013.01); *H04W 84/045* (2013.01); *H04W 88/085* (2013.01); *H04W 92/20* (2013.01)

(56) References Cited

U.S. PATENT DOCUMENTS

| | | | |
|---|---|---|---|
| 8,804,744 | B2 | 8/2014 | Gao et al. |
| 9,288,823 | B2 | 3/2016 | Lei et al. |
| 9,439,095 | B2 | 9/2016 | He et al. |
| 9,504,029 | B2 | 11/2016 | Yang et al. |
| 9,788,307 | B2 | 10/2017 | Yang et al. |
| 9,813,219 | B2 | 11/2017 | Yang et al. |
| 10,009,803 | B2 | 6/2018 | Dahod et al. |
| 2002/0172178 | A1 | 11/2002 | Suzuki et al. |
| 2003/0235171 | A1 | 12/2003 | Lundstrom et al. |
| 2009/0201813 | A1 | 8/2009 | Speight |
| 2009/0219951 | A1 | 9/2009 | Chun et al. |
| 2009/0252148 | A1 | 10/2009 | Dolganow et al. |
| 2010/0054231 | A1 | 3/2010 | Dolganow et al. |
| 2010/0062781 | A1 | 3/2010 | Dolganow et al. |
| 2010/0067489 | A1 | 3/2010 | Pelletier et al. |
| 2010/0113000 | A1 | 5/2010 | Yao |
| 2010/0260096 | A1 | 10/2010 | Ulupinar et al. |
| 2010/0260097 | A1 | 10/2010 | Ulupinar et al. |
| 2011/0034175 | A1 | 2/2011 | Fong et al. |
| 2011/0242975 | A1 | 10/2011 | Zhao et al. |
| 2011/0267951 | A1 | 11/2011 | Stanwood et al. |
| 2011/0310839 | A1 | 12/2011 | Kenington et al. |
| 2012/0157108 | A1* | 6/2012 | Boudreau ............. H04W 16/32 455/450 |
| 2012/0163298 | A1 | 6/2012 | Zhou et al. |
| 2012/0188953 | A1 | 7/2012 | Won et al. |
| 2012/0230248 | A1 | 9/2012 | Gao et al. |
| 2012/0257581 | A1 | 10/2012 | De |
| 2012/0263120 | A1 | 10/2012 | Gopalakrishnan et al. |
| 2012/0300710 | A1 | 11/2012 | Li et al. |
| 2012/0300747 | A1 | 11/2012 | Westberg et al. |
| 2013/0051329 | A1 | 2/2013 | Take |
| 2013/0083730 | A1 | 4/2013 | Gaal et al. |
| 2013/0163524 | A1 | 6/2013 | Shatzkamer et al. |
| 2013/0188619 | A1 | 7/2013 | Dinan |
| 2013/0201890 | A1 | 8/2013 | Swaminathan et al. |
| 2013/0223272 | A1 | 8/2013 | Tao et al. |
| 2013/0272181 | A1 | 10/2013 | Fong et al. |
| 2013/0301609 | A1 | 11/2013 | Smith et al. |
| 2014/0010125 | A1 | 1/2014 | Tillman et al. |
| 2014/0018090 | A1 | 1/2014 | Khoryaev et al. |
| 2014/0029458 | A1 | 1/2014 | Ye |
| 2014/0043980 | A1 | 2/2014 | Anthony et al. |
| 2014/0120936 | A1 | 5/2014 | Chen et al. |
| 2014/0120947 | A1 | 5/2014 | Siomina |
| 2014/0204895 | A1 | 7/2014 | Frederiksen et al. |
| 2014/0226481 | A1* | 8/2014 | Dahod ................. H04W 72/04 370/235 |
| 2014/0233413 | A1 | 8/2014 | Dahod et al. |
| 2014/0233459 | A1 | 8/2014 | Dahod et al. |
| 2014/0233479 | A1 | 8/2014 | Dahod et al. |
| 2015/0009923 | A1 | 1/2015 | Lei et al. |
| 2015/0312904 | A1 | 10/2015 | Ma et al. |
| 2015/0326456 | A1 | 11/2015 | Dudda et al. |
| 2015/0327236 | A1 | 11/2015 | Lin |
| 2015/0341923 | A1 | 11/2015 | Yang et al. |
| 2016/0057768 | A1 | 2/2016 | Sun et al. |
| 2016/0182286 | A1 | 6/2016 | Lunden et al. |
| 2016/0353430 | A1 | 12/2016 | Chen et al. |
| 2017/0048912 | A1* | 2/2017 | Sharma ................ H04L 43/00 |
| 2017/0181156 | A1 | 6/2017 | Nguyen |
| 2017/0295591 | A1 | 10/2017 | Nguyen et al. |
| 2017/0318577 | A1 | 11/2017 | Yang et al. |
| 2018/0035436 | A1* | 2/2018 | Sharma ............... H04W 72/085 |
| 2018/0077587 | A1 | 3/2018 | Al-Fanek et al. |
| 2018/0123920 | A1* | 5/2018 | Dudda ................ H04L 43/062 |
| 2018/0167889 | A1 | 6/2018 | Rajagopal et al. |
| 2018/0310207 | A1 | 10/2018 | Dahod et al. |

FOREIGN PATENT DOCUMENTS

| | | |
|---|---|---|
| CN | 104137644 A | 11/2014 |
| EP | 1189388 A2 | 3/2002 |
| EP | 2200390 A2 | 6/2010 |
| EP | 2501141 A2 | 9/2012 |
| EP | 2523505 A1 | 11/2012 |
| EP | 2530988 A1 | 12/2012 |
| EP | 2747376 A1 | 6/2014 |
| EP | 2947903 A1 | 11/2015 |
| GB | 2525935 A | 11/2015 |
| JP | 2012523805 A | 10/2012 |
| JP | 2014-515584 A | 6/2014 |
| WO | WO-2010120828 A1 | 10/2010 |
| WO | WO-2011080714 A2 | 7/2011 |
| WO | WO-2012084636 A1 | 6/2012 |
| WO | WO-2012139016 A2 | 10/2012 |
| WO | WO-2012139664 A1 | 10/2012 |
| WO | 2012/163726 A1 | 12/2012 |
| WO | WO-2012177763 A2 | 12/2012 |
| WO | WO-2013029251 A1 | 3/2013 |
| WO | WO-2013038167 A2 | 3/2013 |
| WO | WO-2013116988 A1 | 8/2013 |
| WO | WO-2014127054 A1 | 8/2014 |
| WO | WO-2014130708 A1 | 8/2014 |
| WO | WO-2014130709 A1 | 8/2014 |
| WO | WO-2014130713 A1 | 8/2014 |
| WO | WO-2014160709 A2 | 10/2014 |
| WO | WO-2014160718 A1 | 10/2014 |
| WO | WO-2014160722 A1 | 10/2014 |
| WO | WO-2015167546 A1 | 11/2015 |
| WO | WO-2017005854 A1 * | 1/2017 ........... H04L 45/121 |

OTHER PUBLICATIONS

Kuwano et al., Optical Access Technologies for Mobile Radio Access Network. IEICE Technical Report. Jan. 2013;112(401):121-5. [Japanese language document with English abstract].

Office Action for Japanese Application No. 2015-558115 dated Aug. 8, 2017.

Balakrishnan, et al., (1995); "Improving Reliable Transport and Handoff Performance in Cellular Wireless Networks", Wireless Networks, ACM, 1:469-481.

Border et al., (2001); "Performance Enhancing Proxies Intended to Mitigate Link-Related Degradations", Network Working Group Request for Comments: 3135; pp. 1-45.

CATT. L1 support for dual connectivity. 3GPP TSG RAN WG1 Meeting #74, Barcelona, Spain, Aug. 19-23, 2013.

Du, et al., (2009); "Downlink Scheduling for Multimedia Multicast/Broadcast over Mobile WiMAX: Connection-Oriented Multistate Adaptation", IEEE Wireless Communications, pp. 72-79.

International Search Report and Written Opinion for PCT/US2016/067271, dated Mar. 16, 2017.

International Search Report for PCT/US2014/016123, dated Jul. 22, 2014.

International Search Report for PCT/US2014/017456, dated Jul. 3, 2014.

International Search Report for PCT/US2014/017459, dated Jul. 3, 2014.

International Search Report for PCT/US2014/017464, dated Jun. 16, 2014.

International Search Report for PCT/US2014/031725, dated Oct. 7, 2014.

International Search Report for PCT/US2014/031744, dated Sep. 4, 2014.

(56) References Cited

OTHER PUBLICATIONS

International Search Report for PCT/US2014/031749, dated Aug. 5, 2014.
International Search Report for PCT/US2014/031753, dated Aug. 14, 2014.
Yoon, et al., (2012); "MuVi", Mobile Computing and Networking, ACM, pp. 209-220.
Huawei. Flow Control for Split Bearers. 3GPP TSG RAN WG3 Meeting #83bis. San Jose del Cabo, Mexico, Mar. 31-Apr. 4, 2014.
International Search Report and Written Opinion for PCT/US2017/026792, dated Jul. 17, 2017.
International Search Report with Written Opinion corresponding to International Patent Application No. PCT/US2016/017585, dated Dec. 20, 2016, 12 pages.

* cited by examiner

DUAL CONNECTIVITY

CROSS-REFERENCE TO RELATED APPLICATIONS

The present application claims priority to U.S. Provisional Patent Appl. No. 62/320,146 to Nguyen et al., filed Apr. 8, 2016, and entitled "Dual Connectivity", and incorporates its disclosure herein by reference in its entirety.

The present application relates to U.S. patent application Ser. No. 14/179,421, filed Feb. 12, 2014 to Dahod et al., and entitled "Long Term Evolution Radio Access Network," which claims priority to U.S. Provisional Patent Application No. 61/763,927, filed Feb. 12, 2013, and entitled "Long Term Evolution (LTE) Radio Access Network (RAN) Architecture," and also relates to U.S. patent application Ser. No. 15/381,939 to Nguyen, filed Dec. 16, 2016, and entitled "Inter-Site Carrier Aggregation with Physical Uplink Control Channel Monitoring", which claims priority to U.S. Provisional Application No. 62/268,942 to Nguyen, filed Dec. 17, 2015, and entitled "Inter-Site Carrier Aggregation with PUCCH Sniffing", and incorporates their disclosures herein by reference in their entireties.

TECHNICAL FIELD

The subject matter described herein generally relates to data processing and in particular, to dual connectivity in wireless communications system, such as a long term evolution network.

BACKGROUND

In today's world, cellular networks provide on-demand communications capabilities to individuals and business entities. Typically, a cellular network is wireless network that can be distributed over land areas, which are called cells. Each such cell is served by at least one fixed-location transceiver, which is referred to as a cell site or a base station. Each cell can use a different set of frequencies than its neighbor cells in order to avoid interference and provide guaranteed bandwidth within each cell. When cells are joined together, they provide radio coverage over a wide geographic area, which enables a large number of mobile telephones, and/or other wireless devices or portable transceivers to communicate with each other and with fixed transceivers and telephones anywhere in the network. Such communications are performed through base stations and are accomplished even if when mobile transceivers are moving through more than one cell during transmission. Major wireless communications providers have deployed such cell sites throughout the world, thereby allowing communications mobile phones and mobile computing devices to be connected to the public switched telephone network and public Internet.

A mobile telephone is a portable telephone that is capable of receiving and/or making telephone and/or data calls through a cell site or a transmitting tower by using radio waves to transfer signals to and from the mobile telephone. In view of a large number of mobile telephone users, current mobile telephone networks provide a limited and shared resource. In that regard, cell sites and handsets can change frequency and use low power transmitters to allow simultaneous usage of the networks by many callers with less interference. Coverage by a cell site can depend on a particular geographical location and/or a number of users that can potentially use the network. For example, in a city, a cell site can have a range of up to approximately ½ mile; in rural areas, the range can be as much as 5 miles; and in some areas, a user can receive signals from a cell site 25 miles away.

The following are examples of some of the digital cellular technologies that are in use by the communications providers: Global System for Mobile Communications ("GSM"), General Packet Radio Service ("GPRS"), cdmaOne, CDMA2000, Evolution-Data Optimized ("EV-DO"), Enhanced Data Rates for GSM Evolution ("EDGE"), Universal Mobile Telecommunications System ("UMTS"), Digital Enhanced Cordless Telecommunications ("DECT"), Digital AMPS ("IS-136/TDMA"), and Integrated Digital Enhanced Network ("iDEN"). The Long Term Evolution, or 4G LTE, which was developed by the Third Generation Partnership Project ("3GPP") standards body, is a standard for a wireless communication of high-speed data for mobile phones and data terminals. LTE is based on the GSM/EDGE and UMTS/HSPA digital cellular technologies and allows for increasing capacity and speed by using a different radio interface together with core network improvements.

Communications between users in existing digital cellular networks are typically defined and/or affected by various factors and/or parameters. These can include latency. Latency can be measured as either one-way (the time from the source sending a packet to the destination receiving it), or a round-trip delay time (the one-way latency from source to destination plus the one-way latency from the destination back to the source). While the existing LTE systems were designed to increase speed of communications by reducing significant latency that plagued its predecessors, such systems are still affected by a substantial amount of latency when mobile users setup communications via the LTE systems. Further, the current LTE systems involve components that are costly and expensive to install and maintain.

A variety of vendors is available for users to choose from for provision of wireless services. To provide effective communication for the users, carrier aggregation can be implemented in the wireless networks. Using carrier aggregation, it is possible to simultaneously schedule a user on multiple component carriers for downlink or uplink data transmission. However, such simultaneous scheduling can result in scheduling and load balancing problems across network. Additionally, in various networks, carriers can belong to different frequency bands, which can result in significant differences in coverage between carriers. Further, at different locations in the network, some users can be scheduled on only a few select carriers while others can have access to an entire set of carriers. In multiple carrier systems, dual connectivity can provide a solution to aggregation of multiple carriers and/or multiple vendors to improve user equipment throughput from a non-ideal backhaul perspective. Thus, there is a need to provide a better packet data convergence flow control and determination of user equipment capability information in a dual connectivity and multi-carrier environment.

SUMMARY

In some implementations, the current subject matter relates to a computer implemented method for transmission of data packets using dual connectivity in wireless communications system. The method can include transmitting a packet data convergence protocol window from a first base station to a second base station and determining a first time for a successful transmission of a data packet from the first base station to a user equipment. The user equipment can be communicatively coupled to at least one of the first base station and the second base station. The method can further include receiving an acknowledgement of a successful transmission of the data packet from the second base station to the user equipment. The second base station can determine a second time for the successful transmission of the data packet from the second base station to the user equipment based on the received packet data convergence protocol window. The method can also include determining, based on a comparison of the first time and the second time, a base station to process at least another data packet and processing the at least another data packet by the determined base station. The determined base station can include at least one of the first base station and the second base station.

In some implementations, the current subject matter can include one or more of the following optional features. The first and second base stations can be communicatively coupled using an X2 communication interface. The first time can be determined by the first base station. In some implementations, at least one of the first base station and the second base station can include at least one of the following: an evolved node B having a base band unit and a remote radio head, a virtual baseband unit, and a portion of an evolved node B.

In some implementations, the first base station can be a master base station and the second base station can be a secondary base station. In some implementations, the master base station can include a packet data convergence protocol functionality and can control flow of packet data convergence protocol data between the master base station and the secondary base station. In alternate implementations, the secondary base station can include a packet data convergence protocol functionality and can control flow of packet data convergence protocol data between the master base station and the secondary base station. In yet further implementations, the master base station and the secondary base station can include a packet data convergence protocol functionality. Each of the master base station and the secondary base station can independently control flow of packet data convergence protocol data between the master base station and the secondary base station.

In some implementations, the method can further include determining an updated packet data convergence protocol window based on the comparison of the first time and the second time, transmitting the updated packet data convergence protocol window to the second base station, and processing the at least another data packet based on the updated packet data convergence protocol window.

In some implementations, the method can also include receiving processing capability of the user equipment. The processing capability can be indicative of data packets capable of being processed by the user equipment. The method can then perform partitioning the determined processing capability between the first base station and the second base station, and assigning at least one partition of the processing capability to the first base station and at least another partition of the processing capability to the second base station, and allocating at least one resource block by at least one of the first base station and the second base station to process at least one assigned partition. In some implementations, partitioning can be determined based on a number of downlink shared channel transport block bits per transmission time interval and soft bits, and uplink shared channel transport block bits.

In some implementations, at least one of the first base station and the second base station includes at least one of the following: a macro base station, a micro base station, a femto base station, a pico base station, and any combination thereof.

In some implementations, the user equipment can be configured to receive transmission from the first base station, the second base station, and/or both.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 1b illustrates further detail of the exemplary LTE system shown in FIG. 1a;

FIG. 1c illustrates additional detail of the evolved packet core of the exemplary LTE system shown in FIG. 1a;

FIG. 1d illustrates an exemplary evolved Node B of the exemplary LTE system shown in FIG. 1a;

DETAILED DESCRIPTION

To address the deficiencies of currently available solutions, one or more implementations of the current subject matter provide for transmission of data packets using dual connectivity, and in particular, a packet data convergence protocol flow control in a wireless communication system, such as a system that can be implemented in long-term evolution ("LTE") network having an intelligent capability. As stated above, some implementations of the current subject matter can be implemented in a long-term evolution communications system and/or any other type of communications systems. An exemplary long-term evolution communications system is described below.

I. Long Term Evolution Communications System

FIGS. 1a-c and 2 illustrate an exemplary conventional long-term evolution ("LTE") communication system 100 along with its various components. An LTE system or a 4G LTE, as it commercially known, is governed by a standard for wireless communication of high-speed data for mobile telephones and data terminals. The standard is based on the GSM/EDGE ("Global System for Mobile Communications"/"Enhanced Data rates for GSM Evolution") as well as UMTS/HSPA ("Universal Mobile Telecommunications System"/"High Speed Packet Access") network technologies. The standard is developed by the 3GPP ("3rd Generation Partnership Project").

Figure 1A:
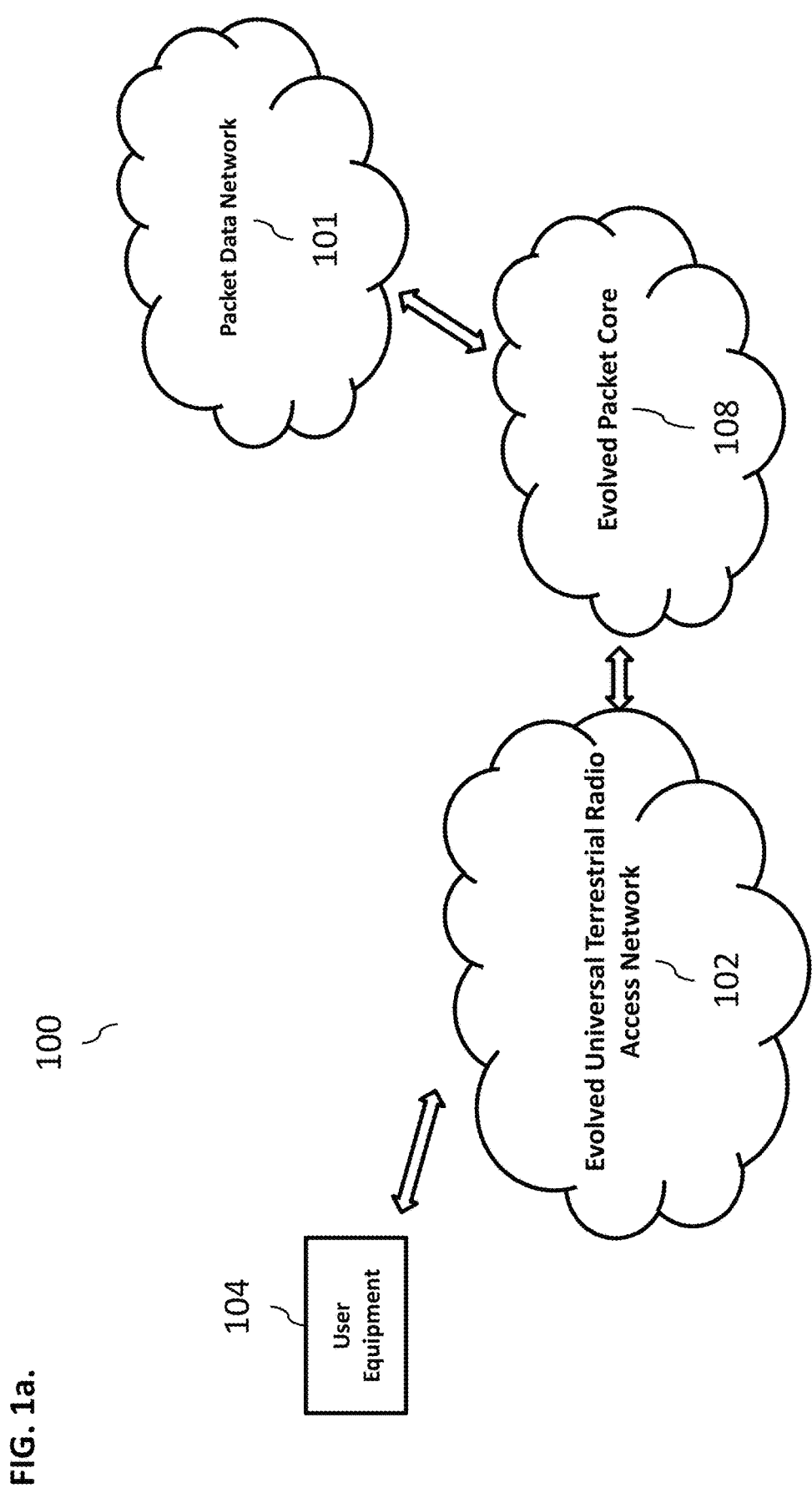
FIG. 1a illustrates an exemplary conventional long term evolution ("LTE") communications system.
Figure 1B:
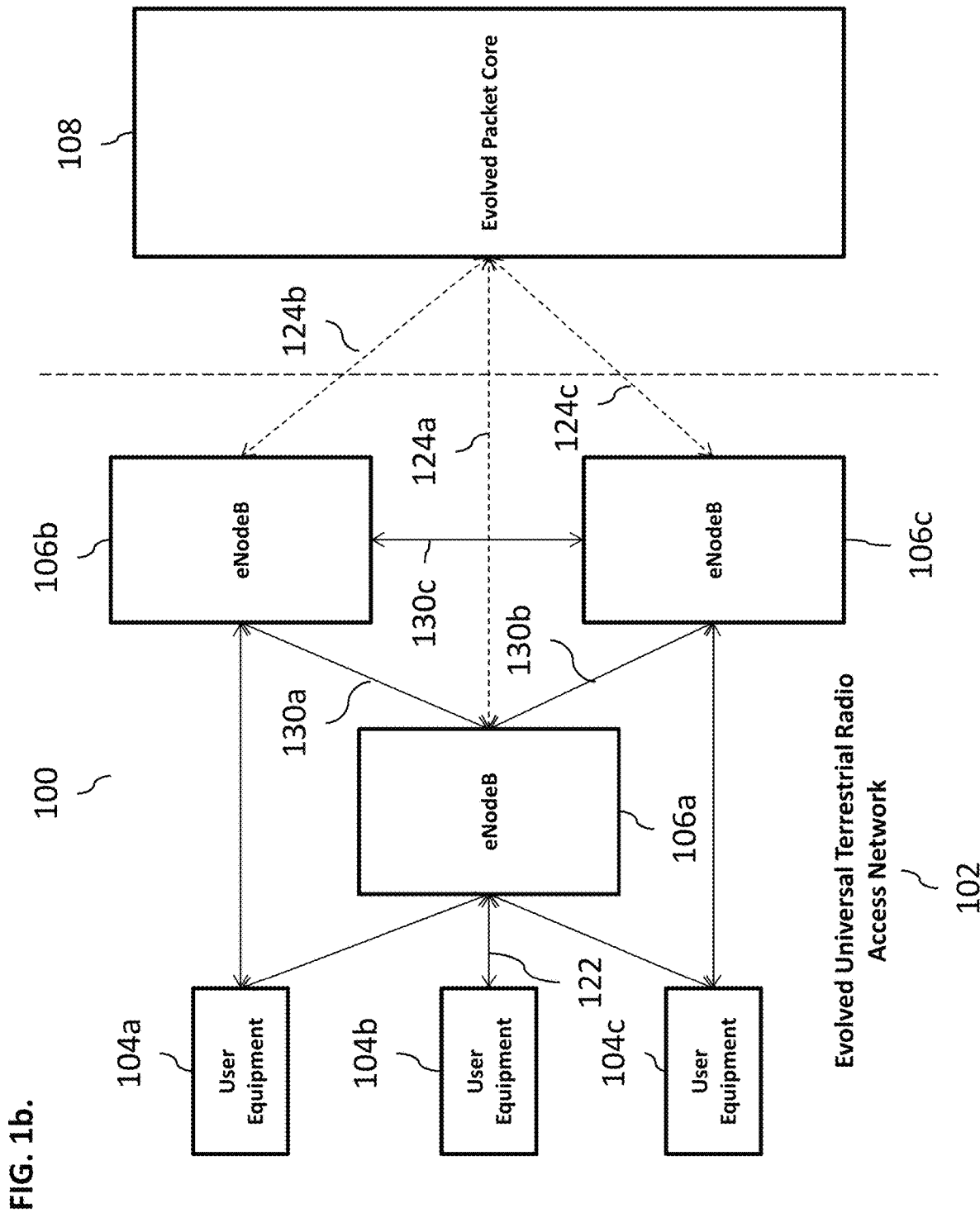

As shown in FIG. 1a, the system 100 can include an evolved universal terrestrial radio access network ("EUTRAN") 102, an evolved packet core ("EPC") 108, and a packet data network ("PDN") 101, where the EUTRAN 102 and EPC 108 provide communication between a user equipment 104 and the PDN 101. The EUTRAN 102 can include a plurality of evolved node B's ("eNodeB" or "ENODEB" or "enodeb" or "eNB") or base stations 106(a, b, c) (as shown in FIG. 1b) that provide communication capabilities to a plurality of user equipment 104(a, b, c). The user equipment 104 can be a mobile telephone, a smartphone, a tablet, a personal computer, a personal digital assistant ("PDA"), a server, a data terminal, and/or any other type of user equipment, and/or any combination thereof. The user equipment 104 can connect to the EPC 108 and eventually, the PDN 101, via any eNodeB 106. Typically, the user equipment 104 can connect to the nearest, in terms of distance, eNodeB 106. In the LTE system 100, the EUTRAN 102 and EPC 108 work together to provide connectivity, mobility and services for the user equipment 104.

Figure 1C:
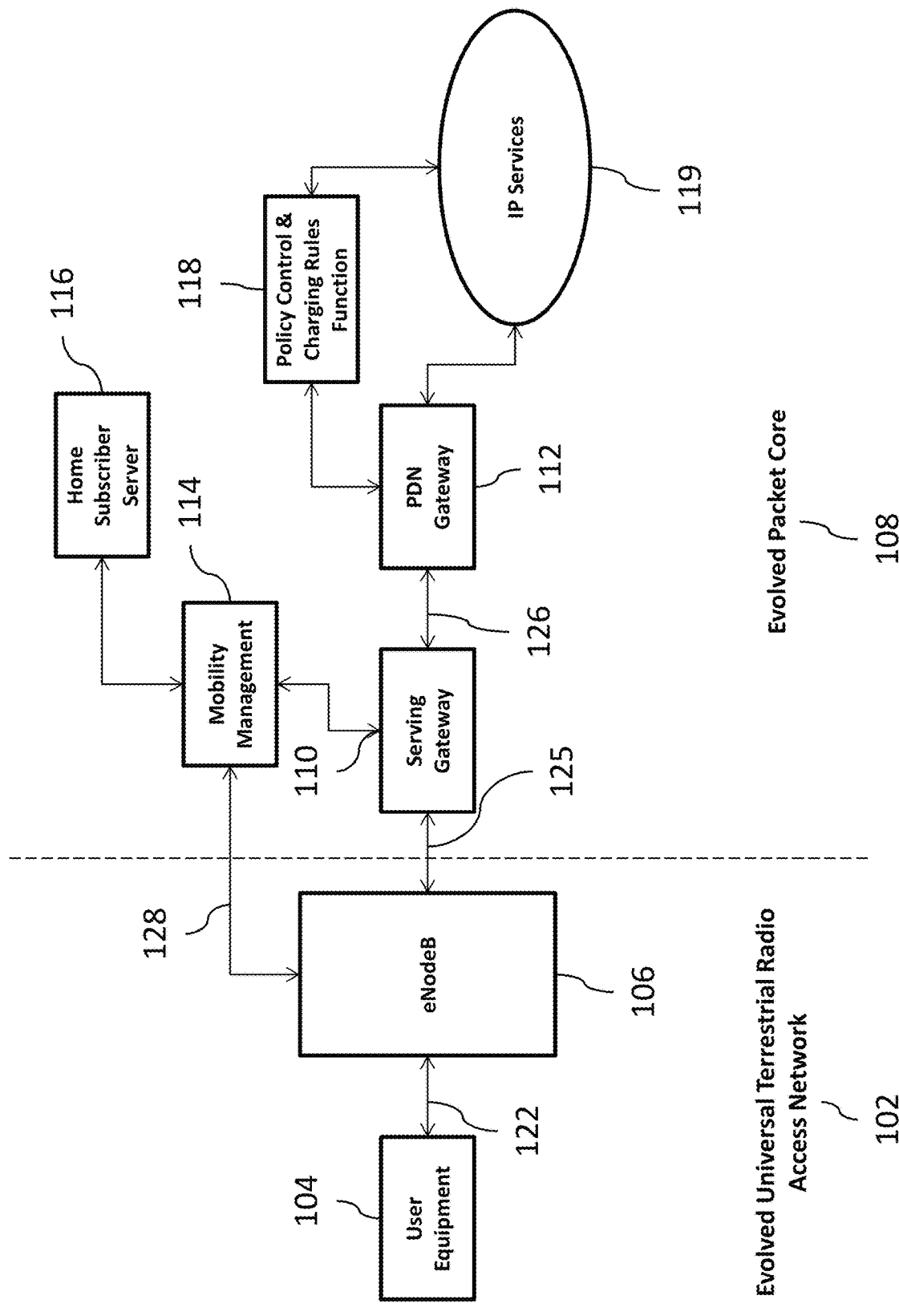

FIG. 1b illustrates further detail of the network 100 shown in FIG. 1a. As stated above, the EUTRAN 102 includes a plurality of eNodeBs 106, also known as cell sites. The eNodeBs 106 provides radio functions and performs key control functions including scheduling of air link resources or radio resource management, active mode mobility or handover, and admission control for services. The eNodeBs 106 are responsible for selecting which mobility management entities (MMES, as shown in FIG. 1c) will serve the user equipment 104 and for protocol features like header compression and encryption. The eNodeBs 106 that make up an EUTRAN 102 collaborate with one another for radio resource management and handover.

Communication between the user equipment 104 and the eNodeB 106 occurs via an air interface 122 (also known as "LTE-Uu" interface). As shown in FIG. 1b, the air interface 122 provides communication between user equipment 104b and the eNodeB 106a. The air interface 122 uses Orthogonal Frequency Division Multiple Access ("OFDMA") and Single Carrier Frequency Division Multiple Access ("SC-FDMA"), an OFDMA variant, on the downlink and uplink respectively. OFDMA allows use of multiple known antenna techniques, such as, Multiple Input Multiple Output ("MIMO").

The air interface 122 uses various protocols, which include a radio resource control ("RRC") for signaling between the user equipment 104 and eNodeB 106 and non-access stratum ("NAS") for signaling between the user equipment 104 and MME (as shown in FIG. 1c). In addition to signaling, user traffic is transferred between the user equipment 104 and eNodeB 106. Both signaling and traffic in the system 100 are carried by physical layer ("PHY") channels.

Multiple eNodeBs 106 can be interconnected with one another using an X2 interface 130(a, b, c). As shown in FIG. 1a, X2 interface 130a provides interconnection between eNodeB 106a and eNodeB 106b; X2 interface 130b provides interconnection between eNodeB 106a and eNodeB 106c; and X2 interface 130c provides interconnection between eNodeB 106b and eNodeB 106c. The X2 interface can be established between two eNodeBs in order to provide an exchange of signals, which can include a load- or interference-related information as well as handover-related information. The eNodeBs 106 communicate with the evolved packet core 108 via an S1 interface 124(a, b, c). The S1 interface 124 can be split into two interfaces: one for the control plane (shown as control plane interface (S1-MME interface) 128 in FIG. 1c) and the other for the user plane (shown as user plane interface (S1-U interface) 125 in FIG. 1c).

The EPC 108 establishes and enforces Quality of Service ("QoS") for user services and allows user equipment 104 to maintain a consistent internet protocol ("IP") address while moving. It should be noted that each node in the network 100 has its own IP address. The EPC 108 is designed to inter-work with legacy wireless networks. The EPC 108 is also designed to separate control plane (i.e., signaling) and user plane (i.e., traffic) in the core network architecture, which allows more flexibility in implementation, and independent scalability of the control and user data functions.

The EPC 108 architecture is dedicated to packet data and is shown in more detail in FIG. 1*c*. The EPC 108 includes a serving gateway (S-GW) 110, a PDN gateway (P-GW) 112, a mobility management entity ("MME") 114, a home subscriber server ("HSS") 116 (a subscriber database for the EPC 108), and a policy control and charging rules function ("PCRF") 118. Some of these (such as S-GW, P-GW, MME, and HSS) are often combined into nodes according to the manufacturer's implementation.

The S-GW 110 functions as an IP packet data router and is the user equipment's bearer path anchor in the EPC 108. Thus, as the user equipment moves from one eNodeB 106 to another during mobility operations, the S-GW 110 remains the same and the bearer path towards the EUTRAN 102 is switched to talk to the new eNodeB 106 serving the user equipment 104. If the user equipment 104 moves to the domain of another S-GW 110, the MME 114 will transfer all of the user equipment's bearer paths to the new S-GW. The S-GW 110 establishes bearer paths for the user equipment to one or more P-GWs 112. If downstream data are received for an idle user equipment, the S-GW 110 buffers the downstream packets and requests the MME 114 to locate and reestablish the bearer paths to and through the EUTRAN 102.

The P-GW 112 is the gateway between the EPC 108 (and the user equipment 104 and the EUTRAN 102) and PDN 101 (shown in FIG. 1*a*). The P-GW 112 functions as a router for user traffic as well as performs functions on behalf of the user equipment. These include IP address allocation for the user equipment, packet filtering of downstream user traffic to ensure it is placed on the appropriate bearer path, enforcement of downstream QoS, including data rate. Depending upon the services a subscriber is using, there may be multiple user data bearer paths between the user equipment 104 and P-GW 112. The subscriber can use services on PDNs served by different P-GWs, in which case the user equipment has at least one bearer path established to each P-GW 112. During handover of the user equipment from one eNodeB to another, if the S-GW 110 is also changing, the bearer path from the P-GW 112 is switched to the new S-GW.

The MME 114 manages user equipment 104 within the EPC 108, including managing subscriber authentication, maintaining a context for authenticated user equipment 104, establishing data bearer paths in the network for user traffic, and keeping track of the location of idle mobiles that have not detached from the network. For idle user equipment 104 that needs to be reconnected to the access network to receive downstream data, the MME 114 initiates paging to locate the user equipment and re-establishes the bearer paths to and through the EUTRAN 102. MME 114 for a particular user equipment 104 is selected by the eNodeB 106 from which the user equipment 104 initiates system access. The MME is typically part of a collection of MMEs in the EPC 108 for the purposes of load sharing and redundancy. In the establishment of the user's data bearer paths, the MME 114 is responsible for selecting the P-GW 112 and the S-GW 110, which will make up the ends of the data path through the EPC 108.

The PCRF 118 is responsible for policy control decision-making, as well as for controlling the flow-based charging functionalities in the policy control enforcement function ("PCEF"), which resides in the P-GW 110. The PCRF 118 provides the QoS authorization (QoS class identifier ("QCI") and bit rates) that decides how a certain data flow will be treated in the PCEF and ensures that this is in accordance with the user's subscription profile.

As stated above, the IP services 119 are provided by the PDN 101 (as shown in FIG. 1*a*).

II. eNodeB

Figure 1D:
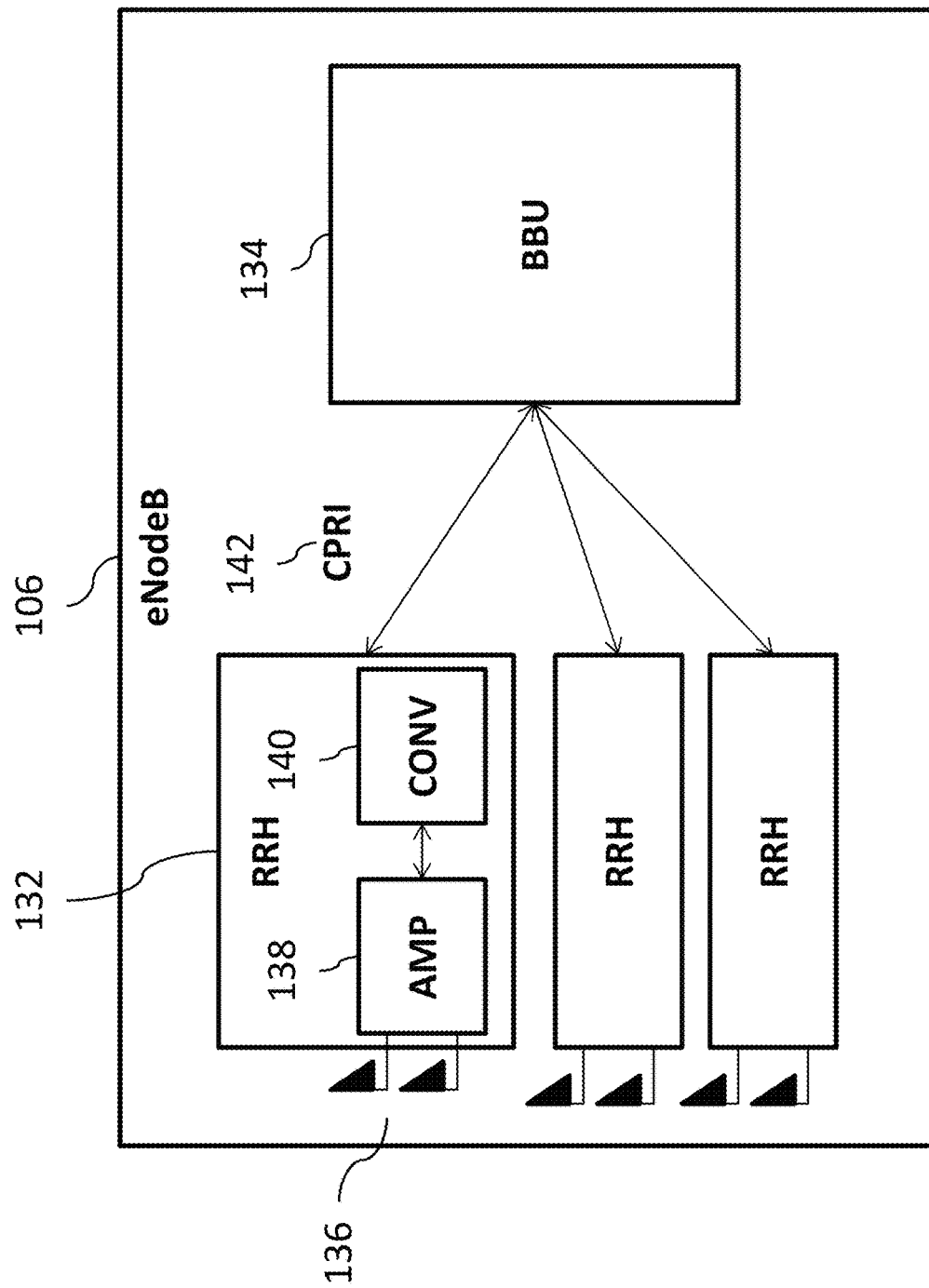

FIG. 1*d* illustrates an exemplary structure of eNodeB 106. The eNodeB 106 can include at least one remote radio head ("RRH") 132 (typically, there can be three RRH 132) and a baseband unit ("BBU") 134. The RRH 132 can be connected to antennas 136. The RRH 132 and the BBU 134 can be connected using an optical interface that is compliant with common public radio interface ("CPRI") 142 standard specification. The operation of the eNodeB 106 can be characterized using the following standard parameters (and specifications): radio frequency band (Band4, Band9, Band17), bandwidth (5, 10, 15, 20 MHz), access scheme (downlink: OFDMA; uplink: SC-OFDMA), antenna technology (downlink: 2×2 MIMO; uplink: 1×2 single input multiple output ("SIMO")), number of sectors (6 maximum), maximum transmission power (60 W), maximum transmission rate (downlink: 150 Mb/s; uplink: 50 Mb/s), S1/X2 interface (1000 Base-SX, 1000 Base-T), and mobile environment (up to 350 km/h). The BBU 134 can be responsible for digital baseband signal processing, termination of S1 line, termination of X2 line, call processing and monitoring control processing. IP packets that are received from the EPC 108 (not shown in FIG. 1*d*) can be modulated into digital baseband signals and transmitted to the RRH 132. Conversely, the digital baseband signals received from the RRH 132 can be demodulated into IP packets for transmission to EPC 108.

The RRH 132 can transmit and receive wireless signals using antennas 136. The RRH 132 can convert (using converter ("CONV") 140) digital baseband signals from the BBU 134 into radio frequency ("RF") signals and power amplify (using amplifier ("AMP") 138) them for transmission to user equipment 104 (not shown in FIG. 1*d*). Conversely, the RF signals that are received from user equipment 104 are amplified (using AMP 138) and converted (using CONV 140) to digital baseband signals for transmission to the BBU 134.

Figure 2:
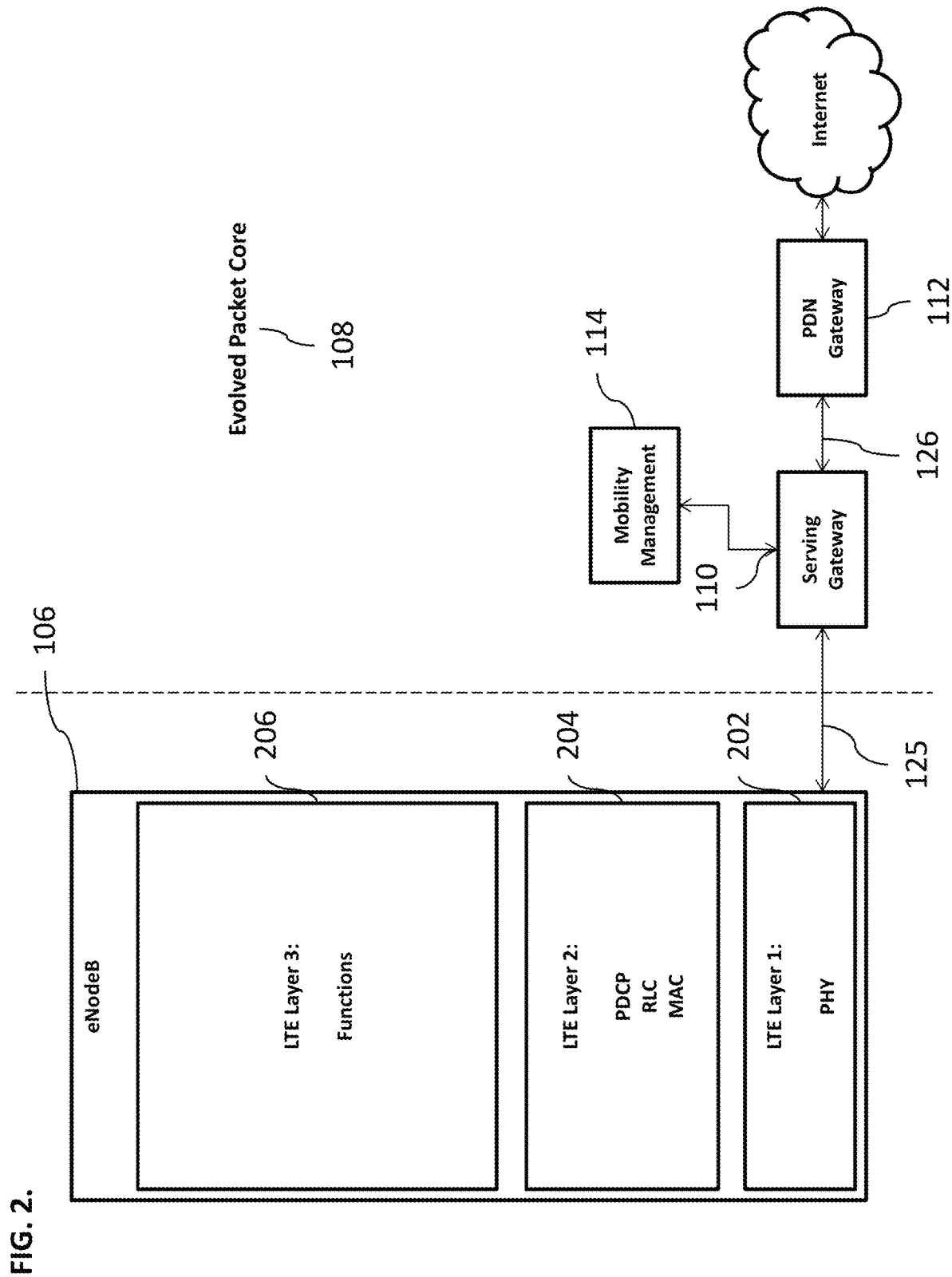
FIG. 2 illustrates further detail of an evolved Node B shown in FIGS. 1a-d.

FIG. 2 illustrates an additional detail of an exemplary eNodeB 106. The eNodeB 106 includes a plurality of layers: LTE layer 1 202, LTE layer 2 204, and LTE layer 3 206. The LTE layer 1 includes a physical layer ("PHY"). The LTE layer 2 includes a medium access control ("MAC"), a radio link control ("RLC"), a packet data convergence protocol ("PDCP"). The LTE layer 3 includes various functions and protocols, including a radio resource control ("RRC"), a dynamic resource allocation, eNodeB measurement configuration and provision, a radio admission control, a connection mobility control, and radio resource management ("RRM"). The RLC protocol is an automatic repeat request ("ARQ") fragmentation protocol used over a cellular air interface. The RRC protocol handles control plane signaling of LTE layer 3 between the user equipment and the EUTRAN. RRC includes functions for connection establishment and release, broadcast of system information, radio bearer establishment/reconfiguration and release, RRC connection mobility procedures, paging notification and release, and outer loop power control. The PDCP performs IP header compression and decompression, transfer of user data and maintenance of sequence numbers for Radio Bearers. The BBU 134, shown in FIG. 1*d*, can include LTE layers L1-L3.

One of the primary functions of the eNodeB 106 is radio resource management, which includes scheduling of both uplink and downlink air interface resources for user equipment 104, control of bearer resources, and admission control. The eNodeB 106, as an agent for the EPC 108, is responsible for the transfer of paging messages that are used to locate mobiles when they are idle. The eNodeB 106 also communicates common control channel information over the air, header compression, encryption and decryption of the user data sent over the air, and establishing handover reporting and triggering criteria. As stated above, the eNodeB 106 can collaborate with other eNodeB 106 over the X2 interface for the purposes of handover and interference management. The eNodeBs 106 communicate with the EPC's MME via the S1-MME interface and to the S-GW with the S1-U interface. Further, the eNodeB 106 exchanges user data with the S-GW over the S1-U interface. The eNodeB 106 and the EPC 108 have a many-to-many relationship to support load sharing and redundancy among MMES and S-GWs. The eNodeB 106 selects an MME from a group of MMES so the load can be shared by multiple MMES to avoid congestion.

III. Intelligent LTE Radio Access Network

Figure 3:
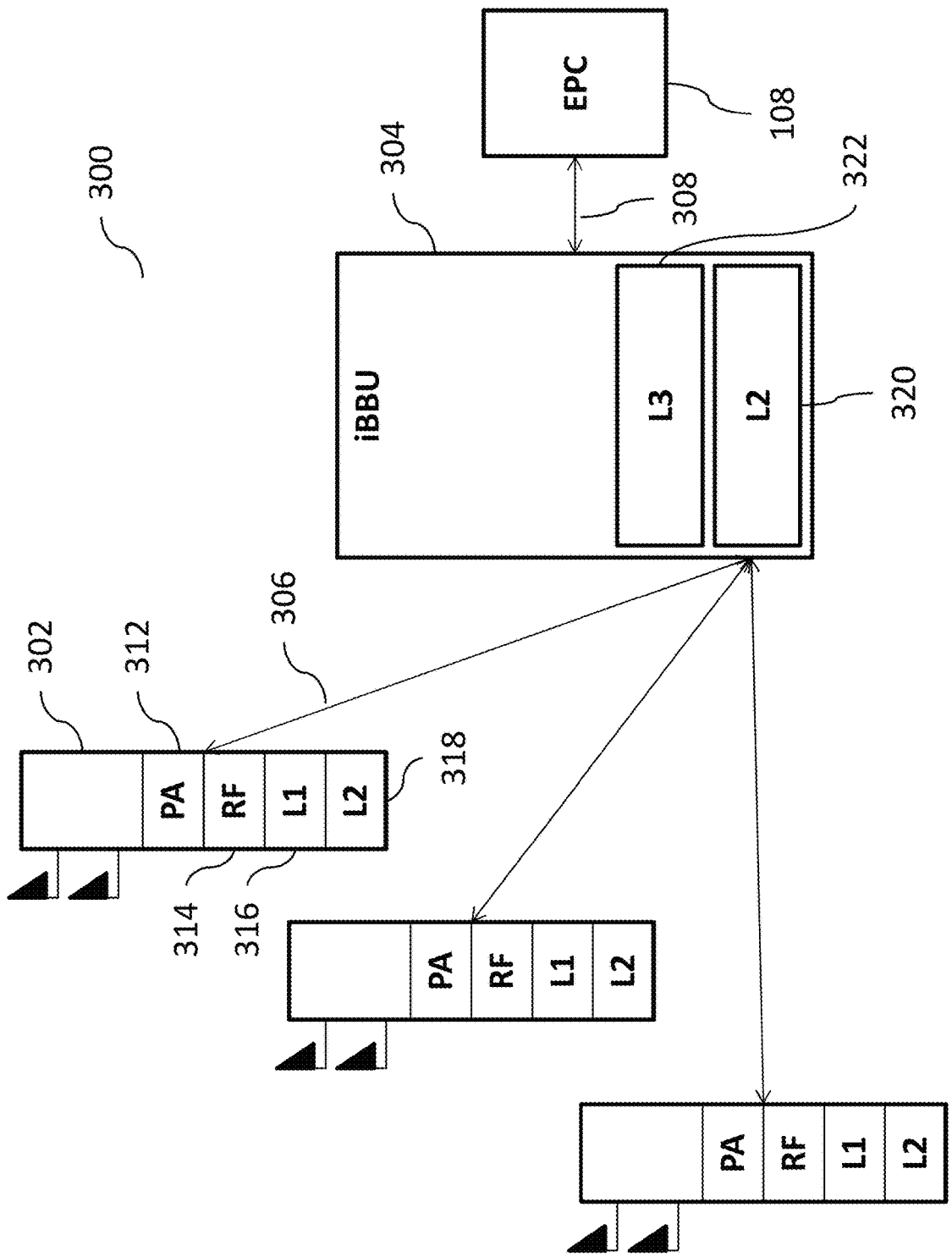
FIG. 3 illustrates an exemplary intelligent Long Term Evolution Radio Access Network, according to some implementations of the current subject matter.

FIG. 3 illustrates an exemplary system 300, according to some implementations of the current subject matter. The system 300 can be implemented as a centralized cloud radio access network ("C-RAN"). The system 300 can include at least one intelligent remote radio head ("iRRH") unit 302 and an intelligent baseband unit ("iBBU") 304. The iRRH 302 and iBBU 304 can be connected using Ethernet fronthaul ("FH") communication 306 and the iBBU 304 can be connected to the EPC 108 using backhaul ("BH") communication 308. The user equipment 104 (not shown in FIG. 3) can communicate with the iRRH 302.

In some implementations, the iRRH 302 can include the power amplifier ("PA") module 312, the radio frequency ("RF") module 314, LTE layer L1 (or PHY layer) 316, and a portion 318 of the LTE layer L2. The portion 318 of the LTE layer L2 can include the MAC layer and can further include some functionalities/protocols associated with RLC and PDCP, as will be discussed below. The iBBU 304 can be a centralized unit that can communicate with a plurality of iRRH and can include LTE layer L3 322 (e.g., RRC, RRM, etc.) and can also include a portion 320 of the LTE layer L2. Similar to portion 318, the portion 320 can include various functionalities/protocols associated with PDCP. Thus, the system 300 can be configured to split functionalities/protocols associated with PDCP between iRRH 302 and the iBBU 304.

In some implementation, the system 300 can implement carrier aggregation ("CA"). The CA features have been discussed in the 3GPP standards for 4G LTE-Advanced, Releases 10 and 11, respectively. Both features are designed to increase data throughput rate and designed to work with 4G LTE-Advanced. The following is a brief summary of each of these features.

A. Carrier Aggregation

The CA or channel aggregation enables multiple LTE carriers to be used together to provide high data rates that are required for 4G LTE-Advanced. These channels or carriers can be in contiguous elements of the spectrum, or they may be in different bands. The carriers can be aggregated using contiguous intra-band carrier aggregation, non-contiguous intra-band carrier aggregation, and inter-band non-contiguous carrier aggregation. In the contiguous intra-band carrier aggregation, carriers are adjacent to one another and aggregated channel can be considered by a user equipment as a single enlarged channel from a radio frequency ("RF") viewpoint and only one transceiver is required within the user equipment (usually, more transceivers are required where the channels are not adjacent). In the non-contiguous intra-band carrier aggregation typically requires two transceivers and a multi-carrier signal is not treated as a single signal. In the inter-band non-contiguous carrier aggregation, multiple transceivers are required to be present within a single user equipment, which can affect cost, performance and power. Additionally, this aggregation technique can require reduction in intermodulation and cross modulation from the two transceivers. When carriers are aggregated, each carrier can be referred to as a component carrier. There exist two categories of component carriers: a primary component carrier (i.e., main carrier in any group; there are a primary downlink carrier and an associated uplink primary component carrier), and a secondary component carrier (there are one or more secondary component carriers). Association between downlink primary and corresponding uplink primary component carriers is cell specific.

When LTE carrier aggregation is used, it is necessary to be able to schedule the data across the carriers and to inform the terminal of the DCI rates for different component carriers. Cross-carrier scheduling can be achieved individually via RRC signaling on a per component carrier basis or a per user equipment basis. When no cross-carrier scheduling is arranged, the downlink scheduling assignments can be achieved on a per carrier basis. For the uplink, an association can be created between one downlink component carrier and an uplink component carrier. When cross-carrier scheduling is active, the physical downlink shared channel ("PDSCH") on the downlink or the physical uplink shared channel ("PUSCH") on the uplink is transmitted on an associate component carrier other than the physical downlink control channel ("PDCCH"), the carrier indicator in the PDCCH provides the information about the component carrier used for the PDSCH or PUSCH. The PDSCH is the main data bearing channel allocated to users on a dynamic basis and that carries data in transport blocks ("TB") that correspond to a MAC packet data unit ("PDU"), which are passed from the MAC layer to the PHY layer once per transmission time interval ("TTI") (i.e., 1 ms). The PUSCH is a channel that carries user data and any control information necessary to decode information such as transport format indicators and MIMO parameters. The PDCCH is a channel that carries resource assignment for user equipments, which are contained in a downlink control information ("DCI") message.

There exist five deployment scenarios for CA. In the first scenario, cells (e.g., F1 and F2 cells) can be co-located and overlaid, thereby providing nearly the same coverage. Both layers provide sufficient coverage and mobility can be supported on both layers. In the second scenario, cells F1 and F2 can be co-located and overlaid, however, F2 cells have smaller coverage due to larger path losses, where only F1 cells provide sufficient coverage and F2 cells are used to improve throughput. Here, mobility is performed based on F1 cells coverage. In the third scenario, F1 and F2 cells are co-located and overlaid, however, F2 cells have smaller coverage due to larger path losses, where only F1 cells provide sufficient coverage and F2 cells are used to improve throughput. Here, mobility is based on F1 cells coverage. In the fourth scenario, F1 cells provide macro coverage and F2 cells' remote radio heads are used to improve throughput at hot spots, where mobility is again performed based on F1 cells coverage. In the fifth scenario, which is similar to the second scenario, frequency selective repeaters are deployed so that coverage is extended for one of the carrier frequencies. It is expected that F1 and F2 cells of the same eNodeB can be aggregated where coverage overlaps.

B. Ethernet-Based Front Haul in Intelligent LTE RAN

Figure 4:
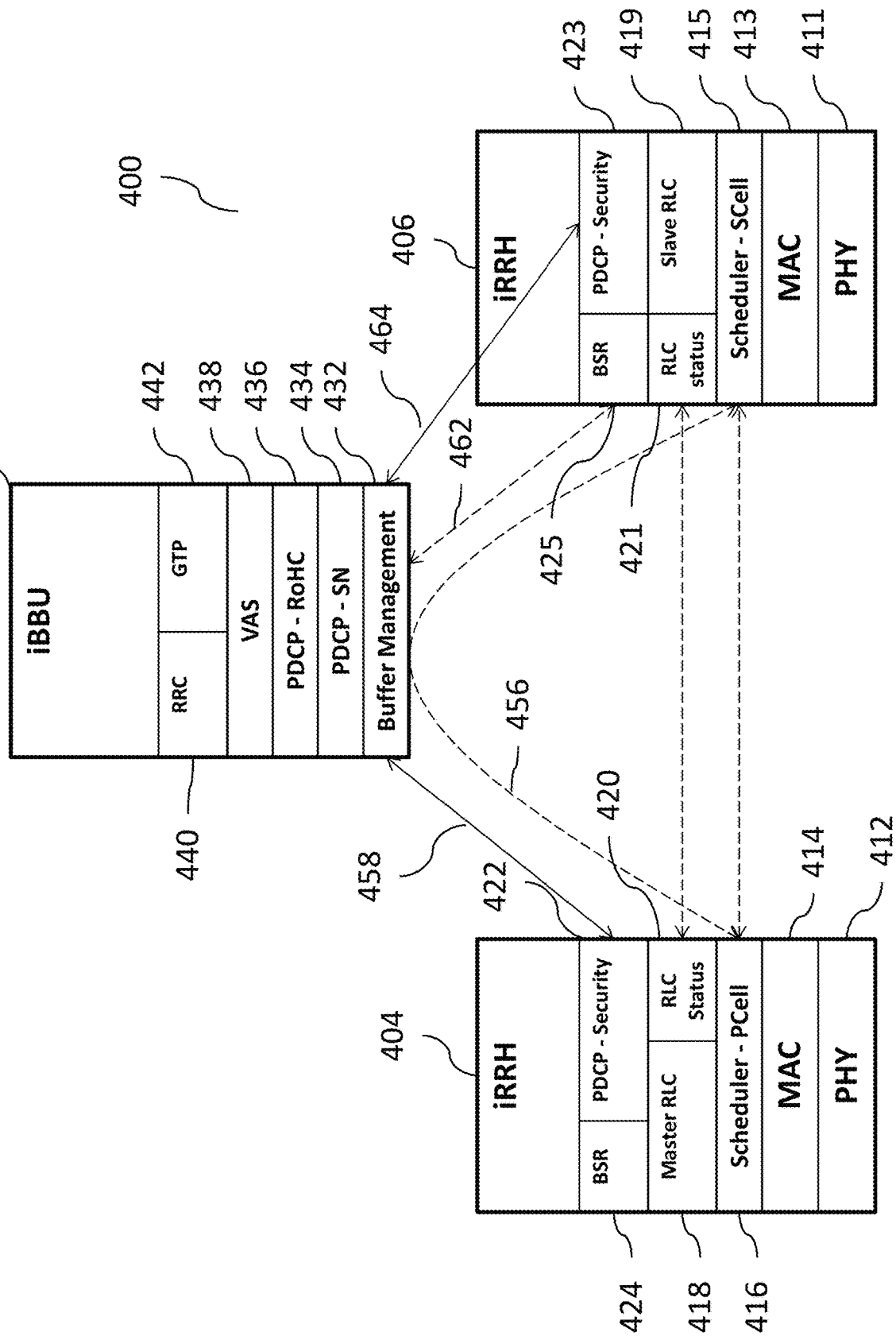
FIG. 4 illustrates an exemplary intelligent Long Term Evolution Radio Access Network implementing carrier aggregation feature, according to some implementations of the current subject matter.

FIG. 4 illustrates an exemplary system 400, according to some implementations of the current subject matter. The system 400 can be configured to implement 4G LTE-Advanced features, including carrier aggregation feature. The system 400 can include an intelligent baseband unit ("iBBU") 402, a primary cell ("Pcell") intelligent remote radio head 404 and one or more secondary cells ("Scell") intelligent remote radio heads 406. An exemplary system 400 is disclosed in co-owned, co-pending, U.S. patent application Ser. No. 14/179,421, filed Feb. 12, 2014 to Dahod et al., and entitled "Long Term Evolution Radio Access Network," which claims priority to U.S. Provisional Patent Application No. 61/763,927, filed Feb. 12, 2013, and entitled "Long Term Evolution (LTE) Radio Access Network (RAN) Architecture", the disclosures of which are incorporated herein by reference in their entireties. In LTE CA, the Pcell is the serving cell where the UE has an RRC connection with the radio access network. Pcell can only be changed through a successful execution of a handover procedure. Scell is a secondary cell that can be added/removed from the configured cells list when the UE moves into/out of its coverage area. The configuration of a Scell is done by RRC based on mobility measurement events triggered in the UE and sent to RRC.].

As shown in FIG. 4, each iRRH 404 and 406 can both include the LTE layer 1 (i.e., the PHY layer) and have LTE layer 2 (i.e., MAC, PDCP, RLC) split among themselves as well as iBBU 402. The iRRH 404 can include a PHY layer 412, a MAC layer 414, a scheduler-Pcell component 416, a master RLC component 418, a RLC status component 420, a PDCP-security component 422, and a BSR component 424. Similarly, the iRRH 406 can include a PHY layer 411, a MAC layer 413, a scheduler-Scell component 415, a slave RLC component 419, a RLC status component 421, a PDCP-security component 423, and a BSR component 425. The iBBU 402 can include a buffer management component 432, a PDCP-SN component 434, a PDCP-RoHC component 436, a VAS component 438, an RRC component 440, and a GTP component 442.

The buffer management component 432 can implement use of buffer occupancy reports that can be received from the iRRH's to control flow of user data to the Pcell and/or Scell in order to enable in sequence delivery of the data to the user equipment. The PDCP-SN component 434 can perform sequence numbering of the PDCP service data units ("PDCP SDUs"). The PDCP robust header compression ("PDCP-RoHC") component 436 can perform IP header compression for voice-over-LTE service flows. The value added services ("VAS") component 438 can provide application intelligence in the eNodeB by performing shallow packet inspection and deep packet inspection of data flows. This component can also determine how a particular data flow can be treated. A shallow packet inspection ("SPI") can be performed by inspecting one or more headers of the data packet to determine information associated with the data packet. For example, the shallow packet inspection can inspect an IP header of the data packet in order to determine the source IP address of the data packet. In some implementations, based on the results of the shallow packet inspection, a deep packet inspection ("DPI") can be performed by examining other layers of the data packet. In some implementations, the payload of a data packet can be inspected to determine what resource blocks should be assigned to the data packet.

The iRRH 404 and the iRRH 406 can communicate with one another via an inter-iRRH interface, which can be a direct connection 452, or a connection that can be shared with a fronthaul connection 458. The iRRH 404 can communicate with the iBBU 402 using the fronthaul ("FH") connection 458 and the iRRH 406 can communicate with the iBBU 402 using FH connection 464.

In some implementations, the iBBU 402 can provide a centralized remote radio resource control ("RRC") using RRC component 440, thereby eliminating a need for a long-delay inter-RRC coordination and providing an ability to configure LTE layer 2 in iRRH 404 and 406. This capability can be implemented as part of the coordinated multipoint transmission feature, as discussed below.

As shown in FIG. 4, the functionalities associated PDCP protocol can be split among the iBBU 402, the iRRH 404, and the iRRH 406. The PDCP-ROHC 436 (where ROHC refers to robust header compression protocol that is used to compress packets) and the PDCP-SN 434 (where SN refers to sequence numbering) together with buffer management component 432 in iBBU 402 can be referred to as PDPC-upper, and PDCP-security 422, 423 in iRRH 404, 406, respectively, can be referred to as PDCP-lower. By having PDCP-upper in the iBBU 402 and PDCP-lower in iRRH 404, 406, the PDCP functionalities can be centralized to handle the ROHC and sequence numbering functions by the iBBU 402, and ciphering functions by the iRRH (which refer to known functionalities of the PDPC). In some implementations, the PDCP-upper in iBBU 402 can also handle coordination of data flows to the schedulers in the iRRHs.

Further, by using PDCP-upper and PDCP-lower, flow control between iBBU 402 and iRRH 406 can be provided. The flow control can depend on an estimated data rate for the bearer. For example, on the downlink 462, the PDCP-upper can send compressed and numbered packets to Pcell iRRH 404 and Scell iRRH 406 in proportion based on buffer occupancy level and estimated data rate from the reports provided by PDCP-lower. In some implementations, the PDCP-lower can generate a report of a buffer occupancy level. This report can be generated periodically, upon request, automatically, manually, and/or on for any period of time. Based on the report, the PDCP-upper can estimate a buffer draining rate based on consecutive buffer occupancy reports (e.g., two reports), a time that elapsed between the reports and the additional data that was sent to the buffer between the reports.

The iBBU 402 can include a buffer management function 432 to support the in-sequenced delivery of PDCP packet data units ("PDCP PDU") and support value added services ("VAS") multi-queue implementation for the default bearer. The buffer management function 432 can detect buffer stalling in the Scell 406 and trigger a redirection of the staled PDCP PDU packets to the Pcell 404. PDCP-lower can detect outdated packets and discard them from its buffer. The in-sequenced delivery of PDCP PDUs can refer to a requirement for data flow transmitted in RLC acknowledged and unacknowledged modes. VAS multi-queue implementation can enable prioritization of data flows within the default bearer. In some implementations, the detection of buffer stalling can be based on an estimated buffer drain rate that can be derived from the buffer occupancy reports received from the PDCP-lower.

In some implementations, to perform redirection of packets, the PDCP-upper can tag each packet data unit with time-to-live information (which can refer to an amount of time before a data packet expires). Then, the PDCP-lower can remove the packet from its buffer when the time-to-live timer for that packet expires and inform the PDCP-upper of the deleted packet's number. The PDCP-upper can decide whether to resend the deleted packet to the same PDCP-lower and/or redirect the deleted packet to a PDCP-lower of another iRRH. The discarding of packets can be performed on the Pcell and/or the Scell and the packets can be redirected toward the Pcell and/or the Scell.

In some implementations, the RLC protocol handling can be split between iRRH 404 and iRRH 406, where the iRRH 404 can include a master RLC component 418 and the iRRH 406 can include a slave RLC component 419. The master RLC component 418 can allocate an RLC PDU sequence number to the slave RLC component 419, thereby centralizing RLC PDU sequence numbering process. In the current subject matter system, each RLC entity can maintain a list of unacknowledged PDUs that it has transmitted and thus, handle the ARQ procedures for only those unacknowledged PDUs that it has transmitted. This is because the RLC entity might not be aware of other PDUs that can be sent by other entities and/or might not have the original data to handle the re-transmissions of the unacknowledged PDUs. In some implementations, an RLC ARQ status PDU, which can be sent from a user equipment at a rate of once very few 10's of a millisecond, can be shared between the two RLC entities over the inter-iRRH interface, i.e., the direct connection 452 and/or a connection shared with fronthaul 458. In some implementations, the physical connection for this inter-iRRH interface can either be direct and/or through a L2 Ethernet switch. In some implementations, the above inter-iRRH interface can leverage industry standard stream control transport protocol ("SCTP") over IP. The application layer information exchange can be based on an inter-process communication protocols.

In some implementations, the inter-iRRH interface 452 can provide a low latency interface for sharing of the RLC status information PDUs as well as any other information between iRRHs 404 and 406. Channel state information ("CSI"), acknowledgement/non-acknowledgement ("ACK/NACK") signaling, precoding matrix indicator ("PMI"), and rank indicator ("RI") that are received by the Pcell iRRH 404 can be forwarded over the inter-iRRH interface 452 for sharing with an Scell scheduler 415 via the fronthaul or direct gigabit Ethernet ("GE") connection. This information can be available to the Scell scheduler on the same subframe that it was sent in order not to incur any impact the H-ARQ RTT, which can be targeted to be 8 ms. The Scell scheduler can also accommodate longer delay in obtaining the H-ARQ feedback and can impact H-ARQ round trip time on the Scell.

In some implementations, the inter-iRRH interface 452 can be used by the Scell iRRH 406 to inform the Pcell iRRH 404 which PUCCH resource to expect the arrival of the H-ARQ ACK/NACK feedback for a packet sent on the Scell (where the allocation of PUCCH resources is defined in the 3GPP Standards for 4G LTE). By way of a non-limiting example, the scheduler can be designed to determine which user equipment to schedule 2 ms in advance of when the data is transmitted over the air. The H-ARQ ACK/NACK can be sent from the user equipment 4 ms after the data has been received. Thus, to ensure the Pcell iRRH 404 is informed of the PUCCH resource usage before the downlink H-ARQ ACK/NACK information arrives from the user equipment, an exemplary one-way latency for the inter-iRRH interface 452 might not be more than 4 ms. As can be understood, the above is provided as an illustrative non-limiting, exemplary implementation of the current subject matter system. It should be further understood that the current subject matter system is not limited to specific data scheduling parameters and/or particular latency associated with transmission of data, and can be designed using any scheduling, latency and/or any other parameters.

In some implementations, the inter-iRRH transport 456 can be shared with the fronthaul and switched at the iBBU 402 and/or a physical direct connection 452 between the iRRHs 404, 406 using a gigabit Ethernet interface. When the inter-iRRH interface is configured as a switched connection 456 across the fronthaul, the fronthaul latency can be based on a very low latency transport such as in the case when the iBBU 402 and the iRRHs 404 and/or 406 are collocated and/or when based on LOS wireless transport such as MW, mmWave, FSO, when the iRRH's are geographically separated.

IV. Dual Connectivity

Figure 5:
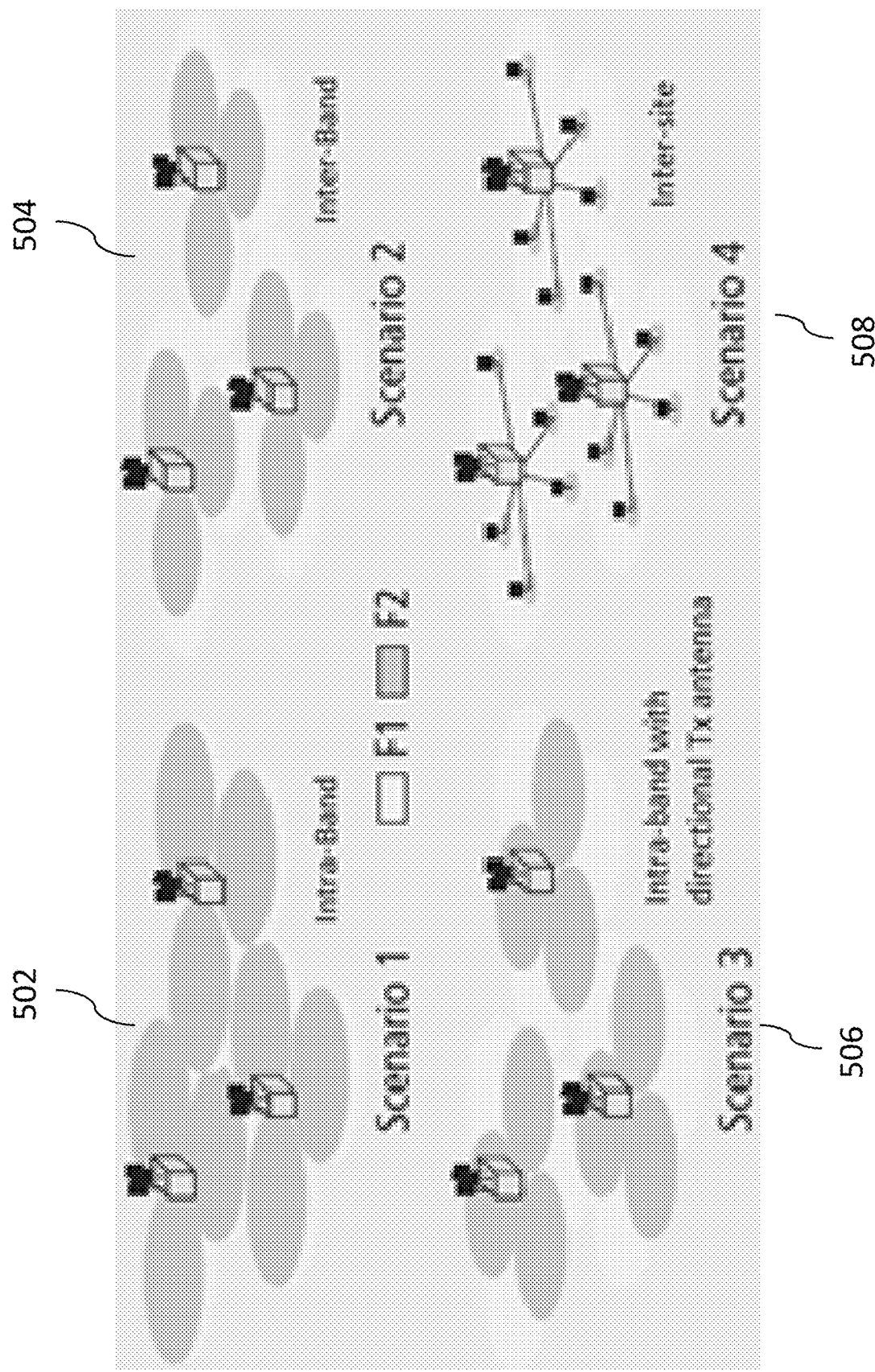
FIG. 5 illustrates various carrier aggregation ("CA") scenarios.

FIG. 5 illustrates carrier aggregation ("CA") scenarios 1, 2, 3, 4 (502, 504, 506, 508). CA scenario 1 502 is an intra-band scenario which includes three geographically co-located sites, each serving a predetermined cell area at particular frequency bands F1 and F2. CA scenario 2 504 is an inter-band scenario that includes three geographically co-located sites, where each site is served at frequency band F2 and another at frequency band F1 (which can serve more distant area away from the cell site). CA scenario 3 506 is an intra-band with direction transmission (Tx) antenna scenario, where each of the three sites operate at a particular frequency band F2 and a transmission frequency band F1. The CA scenario 4 508 is an inter-site scenario, where each site can provide a macro coverage at frequency F2 and be communicatively coupled to remote radio heads operating at another frequency band F1.

Figure 6:
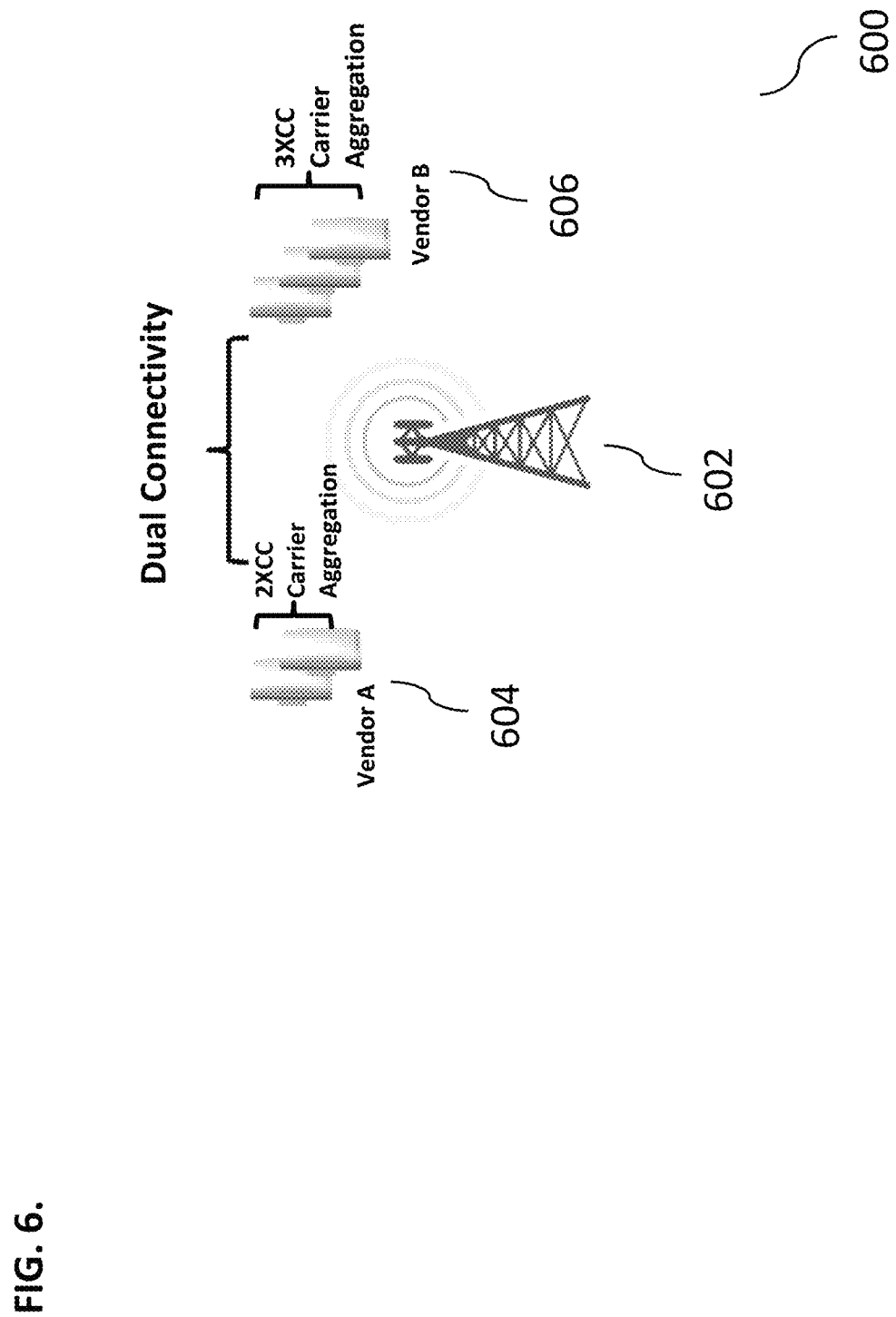
FIG. 6 illustrates exemplary co-deployment system using existing base station (e.g., eNodeB)

FIG. 6 illustrates exemplary co-deployment system 600 using existing base station (e.g., eNodeB). The system 600 can include an existing eNodeB 602 that can be used for providing communication capabilities to a vendor A 604 and vendor B 606. Vendor A can include two component carriers ("2×CC") that can be aggregated and Vendor B can include three component carriers ("3×CC") that can be aggregated. As can be understood, N×carriers can be aggregated in a multi-vendor environment, where the eNodeB 602 can provide a combination of dual connectivity and carrier aggregation as well as multi-vendor support.

Dual connectivity can allow user equipments to receive data simultaneously from different eNodeBs in order to boost performance in a heterogeneous network with a dedicated carrier deployment. Dual connectivity can improve user throughput performance by utilizing radio resources in more than one eNodeB. With different carrier frequencies deployed at master and secondary cell layers, dual connectivity, which can extend carrier aggregation functionality to allow user equipment to simultaneously receive data from both a master or a main cell and a secondary cell eNodeB. Dual connectivity can be extended for deploying two macro cells at two different frequencies. The dual connectivity has been subject to the 3GPP Release 12 standard.

In a typical deployment scenario, master and secondary cells can be interconnected using backhaul connections (e.g., X2 interface) and assume separate and independent radio resource management functionalities (e.g., packet scheduling, MAC, and hybrid automatic repeat request ("HARQ")) residing in each eNodeB. Data can be forwarded from the main cell eNodeB ("MeNB") to the secondary cell eNodeB ("SeNB") over the X2 interface before user equipments configured with dual connectivity capability can receive data from the two cells. Data transmission via the secondary cell can introduce additional delay due to the X2 latency and the buffering time in the secondary cell eNodeB. Data-flow to the user equipment can begin with data arriving from the core network and being transmitted to the MeNB. The MeNB can split the data flow and transmit some data via the master or main cell (i.e., a PCell (as shown in FIG. 4)) to the user equipment and transmit other data over the X2 interface to the SeNB, which can transmit it to another user equipment via the corresponding secondary cell (i.e., SCell (as shown in FIG. 4)).

Figure 7:
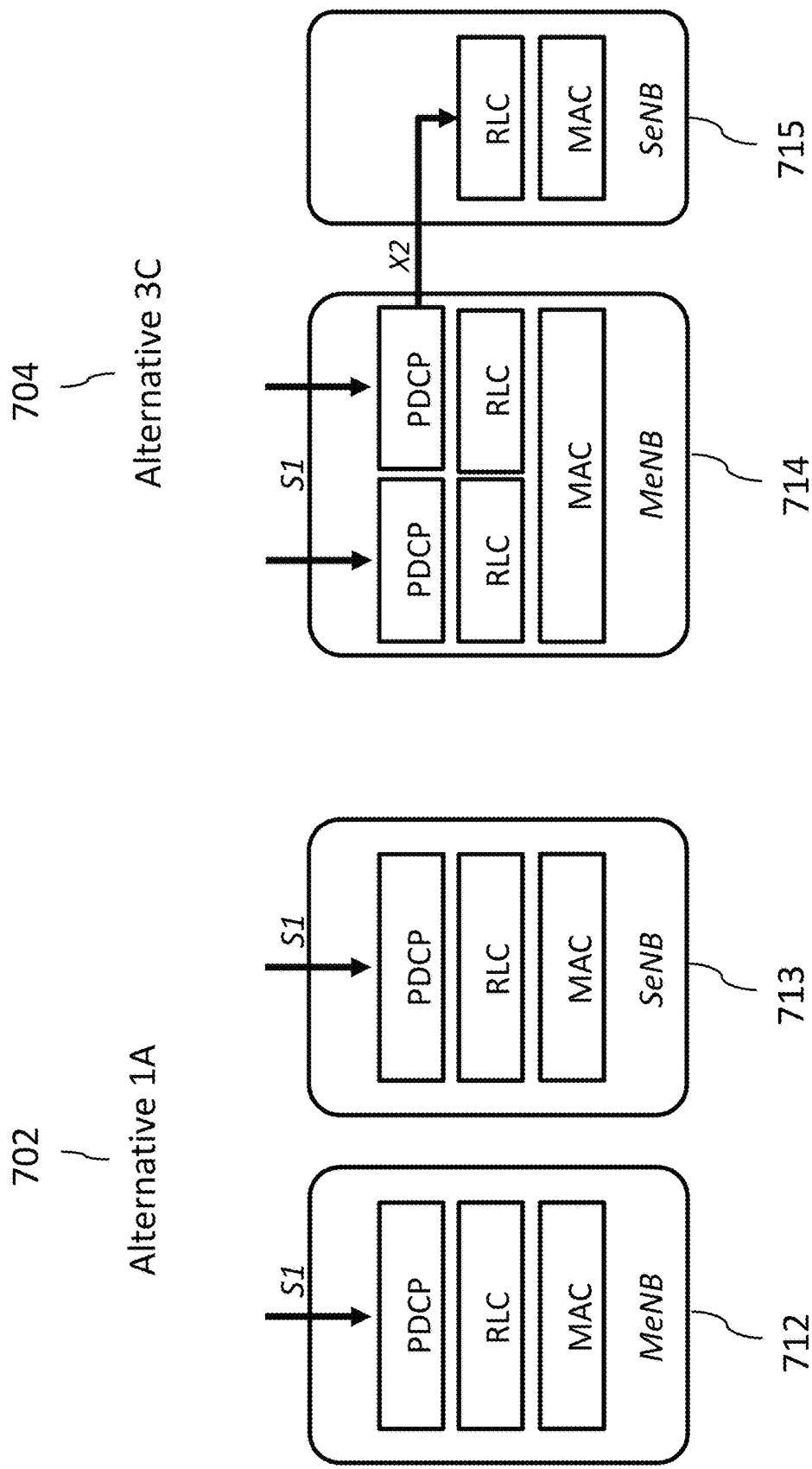
FIG. 7 illustrates various dual connectivity alternatives, which have been identified by the 3 GPP standard.

FIG. 7 illustrates various dual connectivity alternatives, which have been identified by the 3GPP standard. Alternative 1A 702 provides for a MeNB 712 and a SeNB 713, where each can receive data via the S1 connection from the core network (not shown in FIG. 7). As shown in FIG. 7, the PDCP functionalities can be independent between the MeNB and SeNB. The bearer is not split between two eNodeBs. This alternative can decrease inter-vendor interaction and can place various requirements on the backhaul connections. Another negative of this alternative is that the split of data among the bearers and the corresponding offloading to MeNB and SeNB is done at the core network level, and thus, might not be very dynamic.

Alternative 3C 704 provides for a MeNB 714 and a SeNB 715 communicatively coupled via an X2 connection. In this alternative, the data can arrive from the core network via an S1 connection to the MeNB 714 only, which then can use the SeNB 715 for transmission of at least a portion of that data by providing that portion via the X2 connection. Here, a common PDCP functionality can be present and can reside in the MeNB. The bearer can be split and MeNB 714 can control SeNB 715 and the traffic that SeNB 715 receives using the backhaul connection X2.

Figure 8A:
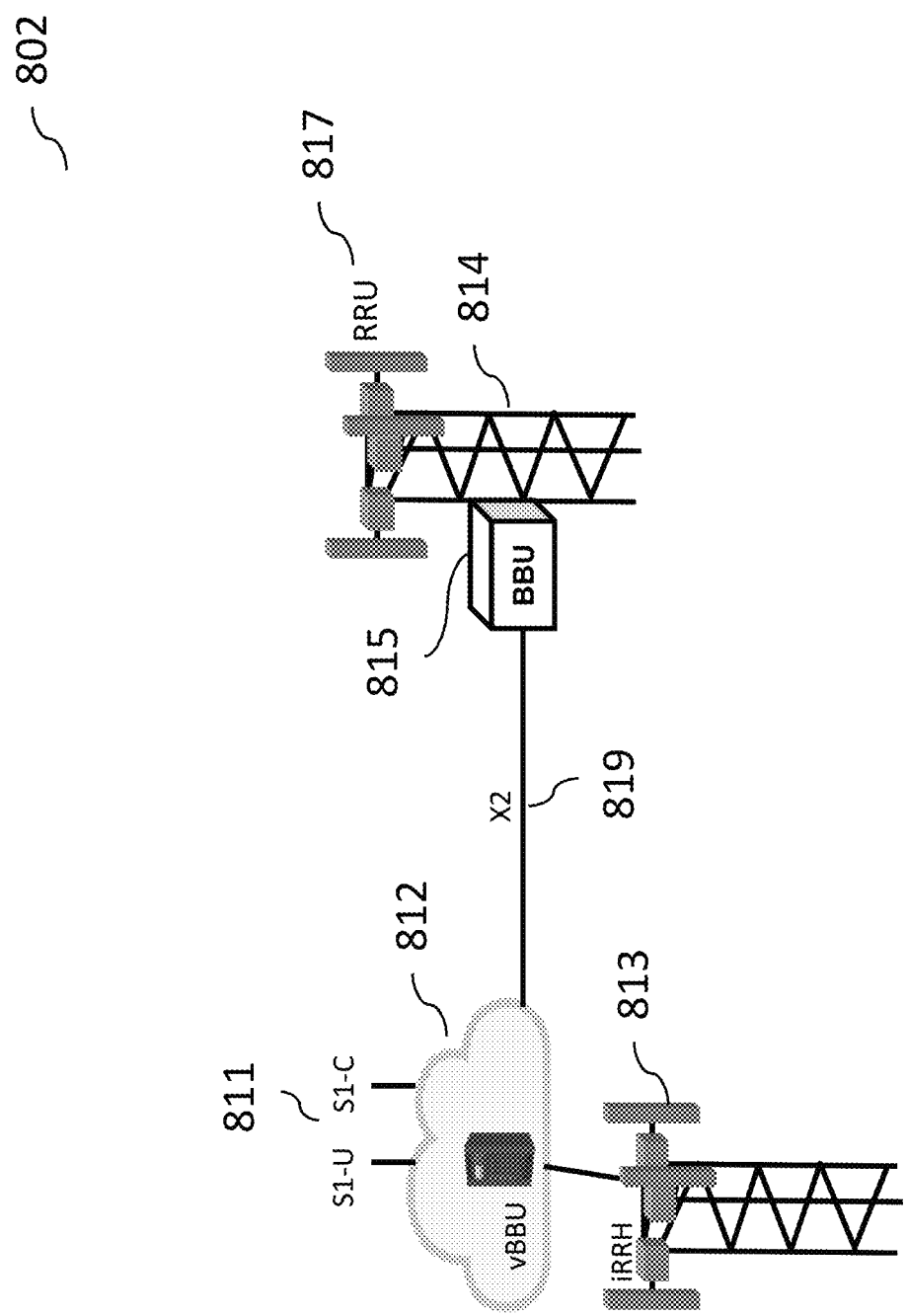
FIG. 8a illustrates an exemplary split bearer (alternative 3C) dual connectivity network environments, according to some implementations of the current subject matter.

FIG. 8a illustrates an exemplary split bearer (alternative 3C) dual connectivity communications system 802, according to some implementations of the current subject matter. The network 802 can include a master cell eNodeB 812, which can perform a PDCP flow control. The master cell 812 can be include a virtual base band unit ("vBBU") communicatively coupled to one or more remote radio heads 813 (e.g., "iRRH" (similar to those shown in FIG. 3)). The iRRH 813 can include RLC, MAC, PHY, and other layers as discussed above in connection with FIGS. 1a-3. The vBBU 812 can virtualize the BBU functionalities and/or services in a centralized baseband unit pool in a central office that can manage on-demand resource allocation, mobility, and interference control for a large number of interfaces using programmable software layers. The vBBU 812 can also be coupled to user and control planes via S1-U and S1-C interfaces 811, respectively. The vBBU 812 can also perform PDCP flow control, as further discussed below.

The vBBU 812 can be communicatively coupled to one or more SeNB 814. The SeNB 814 can correspond to a secondary and/or a small cell eNodeB. The SeNB 814 can include a remote radio unit ("RRU") 817 and a baseband unit ("BBU") 815. The BBU 815 can include the RLC, MAC, PHY, and other layers as discussed above. The SeNB 814 can be communicatively coupled to the vBBU 812 using an X2 connection 819. The functionalities/services provided by one or more SeNB 814 can be associated with different vendors, which may be different than the vendors of the vBBU 812 and the iRRH 813.

The vBBU 812 can receive data from the core network via S1 interfaces 811 and can perform PDCP flow control. Using the X2 connection 819, the vBBU 812 can perform PDCP data forwarding and the SeNB 814 can transmit feedback (e.g., buffer status, CSI/PMI, RI, etc.).

Figure 8B:
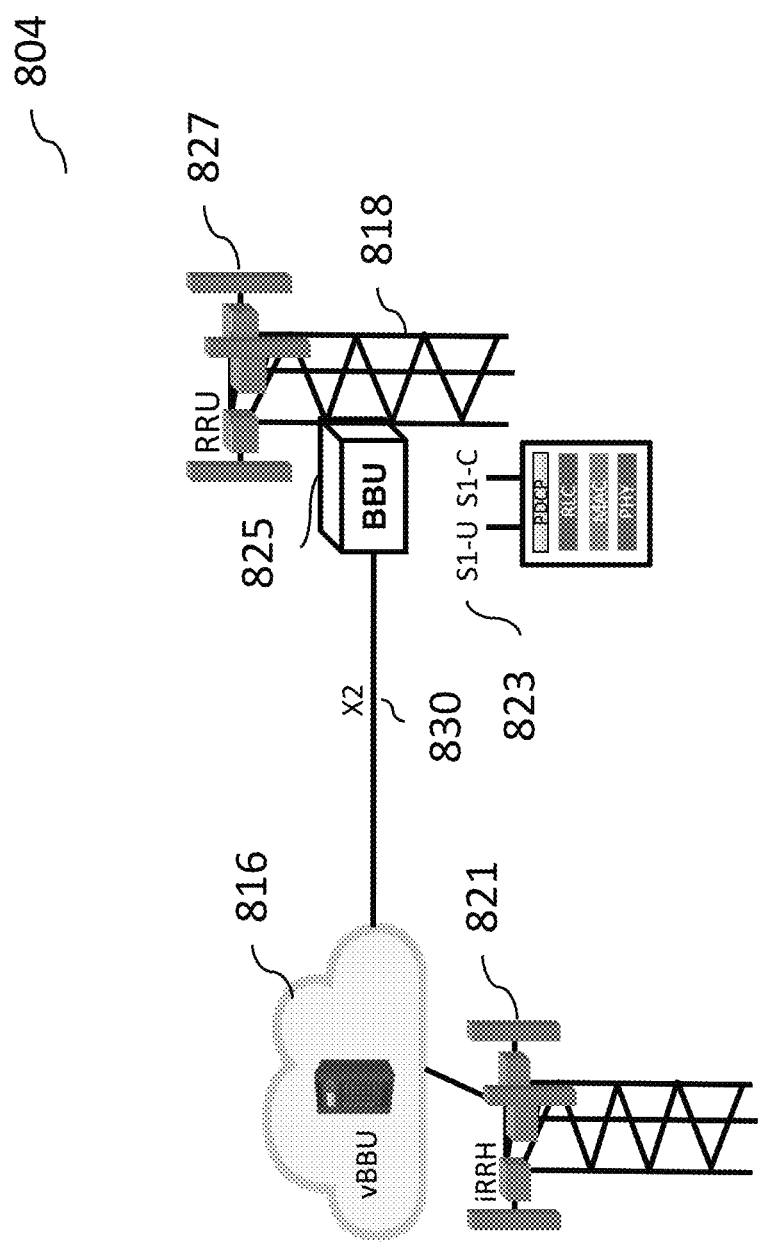
FIG. 8b illustrates another exemplary split bearer (alternative 3C) dual connectivity network environments, according to some implementations of the current subject matter.

FIG. 8b illustrates another exemplary split bearer (alternative 3C) dual connectivity communications system 804, according to some implementations of the current subject matter. In this case, the PDCP flow control functionality can be incorporated into a mast cell eNodeB that is different from the vBBU. The system 804 can include a vBBU 816 communicatively coupled to one or more iRRH 821 (similar to those shown in FIG. 3). The iRRH 821 can include the RLC, MAC, PHY, and other layers, as discussed above. In this case, the vBBU 816 and/or iRRH 821 can serve as a secondary cell to another main cell site.

The system 804 can further include a main or a master eNodeB 818 that can be communicatively coupled to the vBBU 816 using an X2 connection 830. The connection 830 can be used for forwarding PDCP data and for providing feedback (e.g., buffer status, CSI/PMI, RI, etc.) by the secondary cell 821. The eNodeB 818 can include a BBU 825 and an RRU 827. The eNodeB 818 can also be communicatively coupled user and control planes 823 via a respective S1 interface and/or EPC (not shown in FIG. 8b). The eNodeB 818 can incorporate, along with the RLC, MAC, PHY, etc. layers, a PDCP flow control functionality for performing PDPC flow control.

Figure 9:
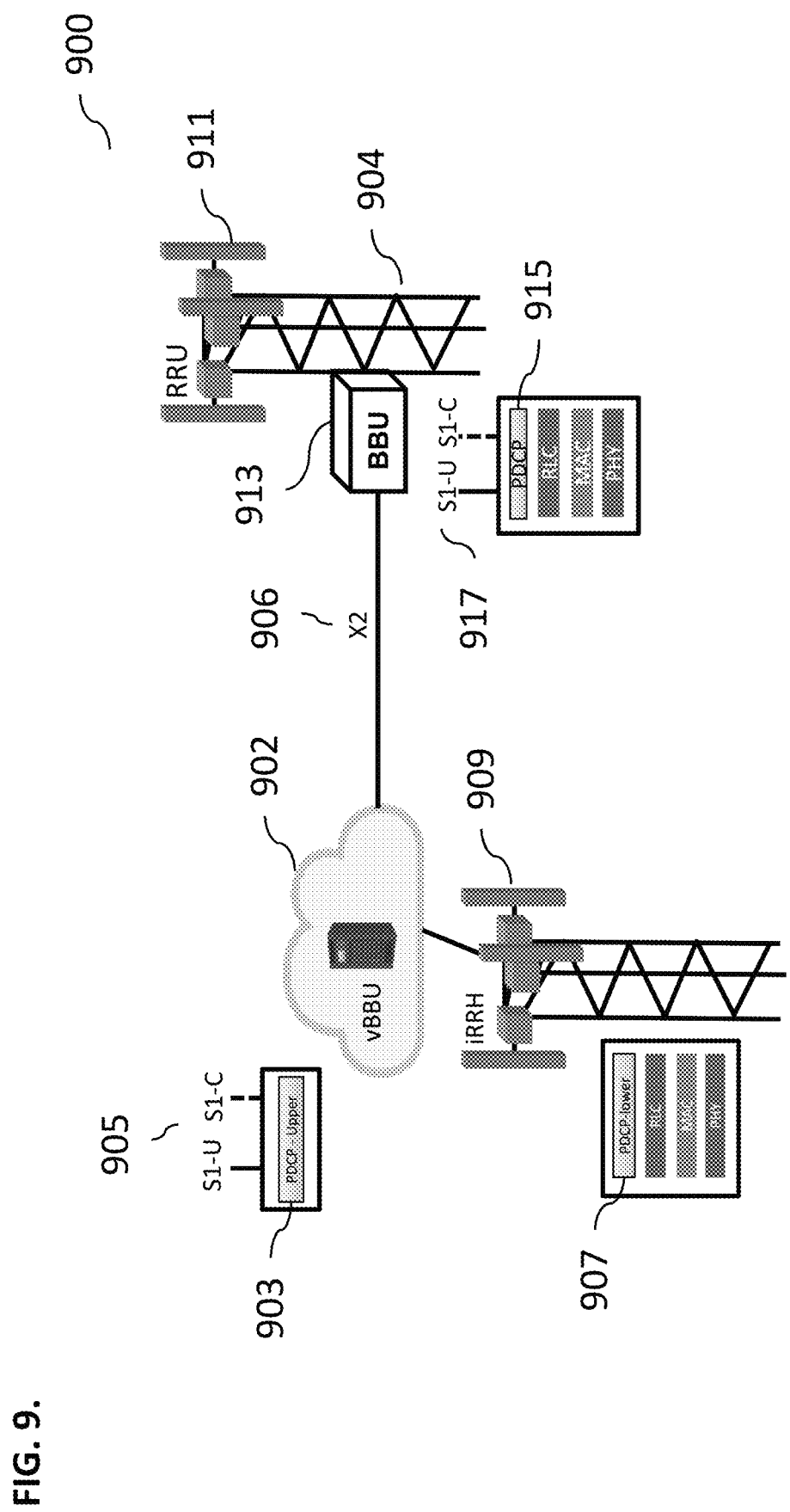
FIG. 9 illustrates an exemplary independent bearer (alternative 1A) dual connectivity system, according to some implementations of the current subject matter.

FIG. 9 illustrates an exemplary independent bearer (alternative 1A) dual connectivity communications system 900, according to some implementations of the current subject matter. The system can include a vBBU 902 communicatively coupled with an iRRH 909. The vBBU 902 and the iRRH 909 can form a MeNB. The vBBU 902 can be communicatively coupled with a secondary eNodeB ("SeNB") 904. The SeNB 904 can include a baseband unit 913 and a remote radio unit 911. The vBBU 902 and the SeNB 904 can be communicatively coupled using an X2 interface 906. The SeNB 904 can use the interface 906 to transmit SeNB feedback (e.g., buffer status, CSI/PMI, RI, etc.).

The vBBU 902 can be communicatively coupled with user and control planes via respective S1 interfaces 905. The PDCP functionalities in the MeNB can be split into PDCP-upper 903 and PDCP-lower 907 (as for example, shown in FIG. 4). Additionally, because of the alternative 1A setup, the SeNB 904 can also be communicatively coupled to the user and control planes using respective S1 interfaces 917 and can also include PDCP functionality 915.

Figure 10:
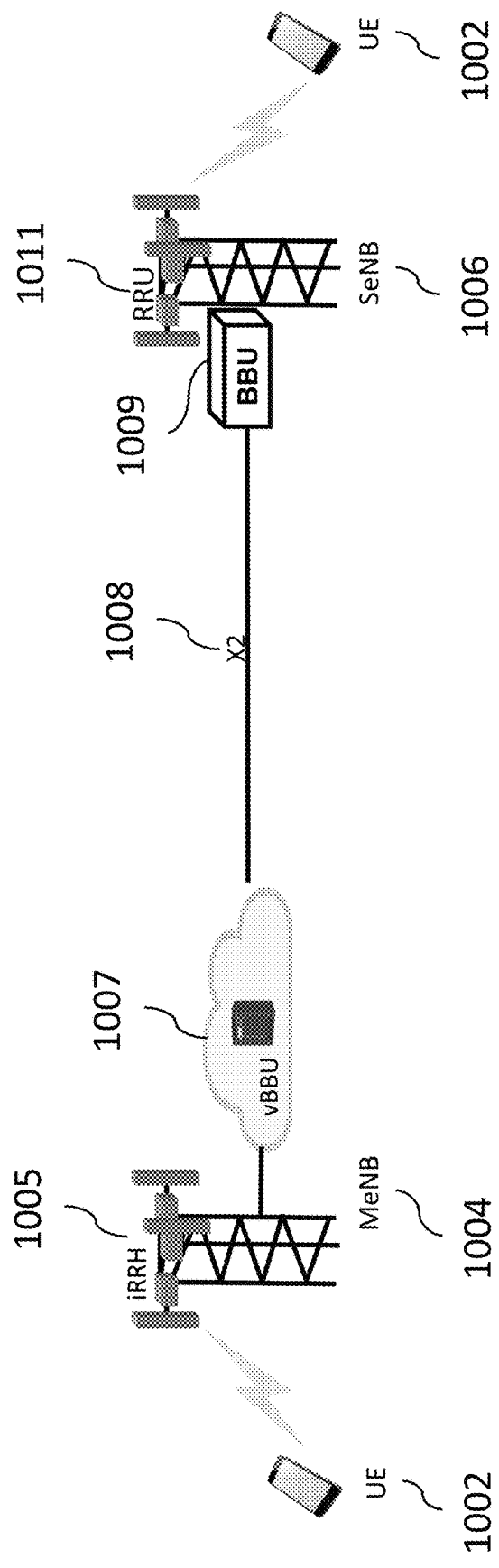
FIG. 10 illustrates an exemplary communications system for performing PDCP flow control, according to some implementations of the current subject matter.

FIG. 10 illustrates an exemplary communications system 1000 for performing PDCP flow control, according to some implementations of the current subject matter. The system 1000 can be used to control data flows that are sent to secondary eNodeBs, which can belong to different wireless communications vendors and can be different from the owner of the master eNodeB. The system 1000 can include a user equipment 1002 communicatively coupled to a MeNB 1004 and to a SeNB 1006.

The MeNB 1004 can include an iRRH 1005 and vBBU 1007. The vBBU 1007 can perform PDCP flow control (e.g., from a central office). The vBBU 1007 can be communicatively coupled to the SeNB 1006 via an X2 communication interface 1008. The SeNB can include a baseband unit 1009 and a remote radio unit 1011. The user equipment 1002 can transmit and receive signals to/from both iRRH 1005 and RRU 1011.

In some implementations, the MeNB 1004 and SeNB 1006 can communicate using different frequencies, e.g., $f_1$ and $f_2$. Use of different frequencies can alleviate interference when communications are received by the user equipment 1002 from both MeNB 1004 and the SeNB 1006.

As stated above, the MeNB 1004 can perform PDPC flow control. The system 1000 can implement intelligent PDCP flow control using end-to-end latency to determine a number of PDCP packet data units ("PDU's") to transfer to SeNB 1006. Further, an adaptive PDCP window ("$W_s$") can be determined and implemented for the purposes of dividing the data load between the MeNB 1004 and/or SeNB 1006 and to ensure that the SeNB 1006 is transmitting at its capacity. To assess whether base stations (i.e., MeNB and SeNB) are performing at their capacities, processing times $T_{MeNB}$ and $T_{SeNB}$ can be determined MeNB 1004 and SeNB 1006, respectively, and then compared. The processing times are representative of the time it takes respective base stations to process a data packet, transmit it to the user equipment 1002 and receive a response (e.g., ACK/NACK) from the user equipment 1002. The base station with the smallest time can be selected for further communications with the user equipment 1002.

Figure 11:
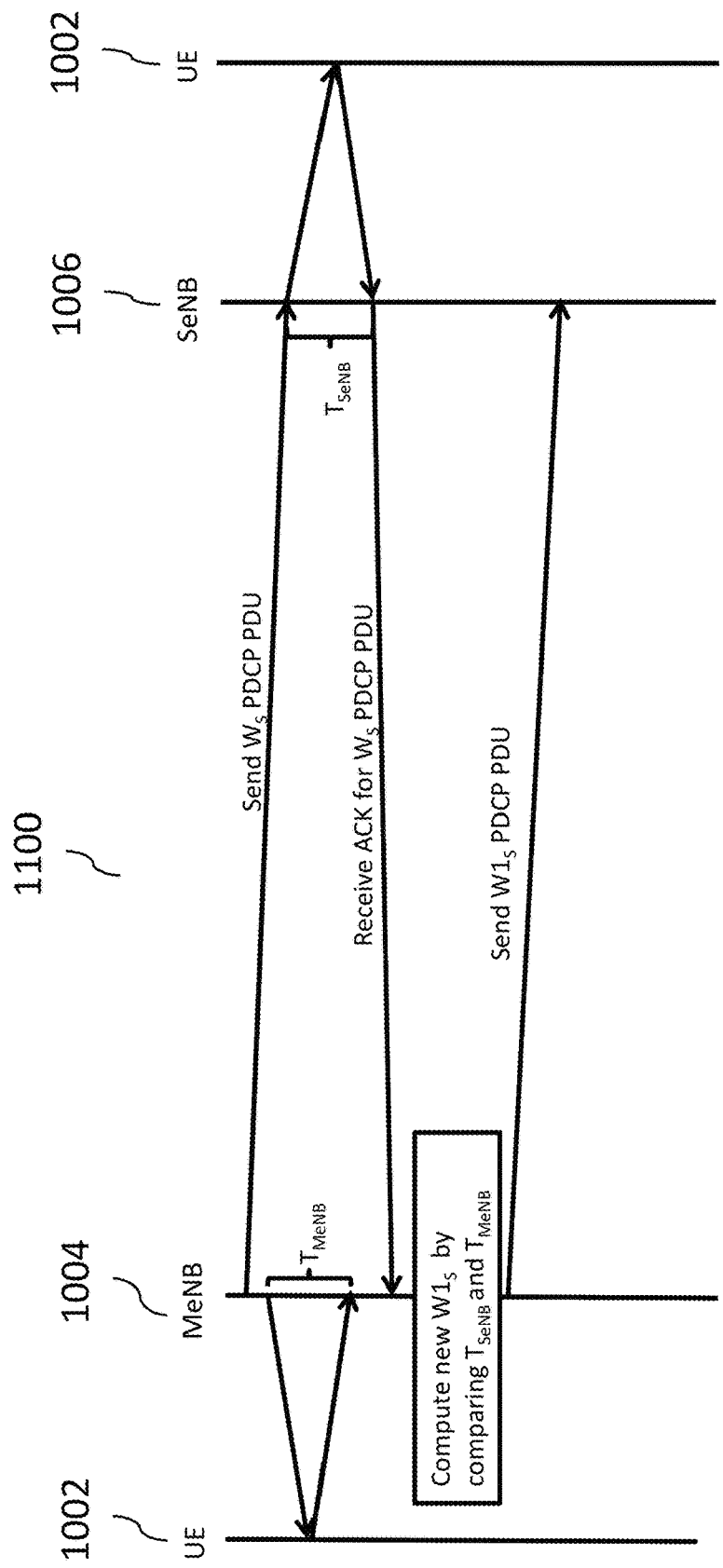
FIG. 11 is an exemplary process flow diagram for performing a PDCP flow control in the system shown in FIG. 10, according to some implementations of the current subject matter.

FIG. 11 is an exemplary process flow diagram 1100 for performing a PDCP flow control in the system 1000 shown in FIG. 10, according to some implementations of the current subject matter. The PDCP flow control process 1100 can be initiated by the MeNB 1004 by transmitting an adaptive PDCP window $W_S$ PDCP PDU to the SeNB 1006. In some implementations, the adaptive PDCP window can be determined based on a variety of factors, components, conditions, etc. including, but not limited, being statically determined for a particular system and/or its components, dynamically determined, and/or any combination thereof. The MeNB 1004 can also communicate with user equipment 1002 and upon receiving of a response from the user equipment 1002, can determine time $T_{MeNB}$. As stated above, the time $T_{MeNB}$ can be determined based on a combined time that it takes the MeNB 1004 to perform various internal processing tasks, transmit data to the user equipment 1002, and/or receive a response from the user equipment 1002.

Upon receipt of the adaptive PDCP window $W_S$ PDCP PDU, the SeNB 1006 can perform various internal processing (e.g., determine its capacity, channel conditions, etc.), communicate with the user equipment 1002 and upon receipt of a response from the user equipment 1008, can determine its own time $T_{SeNB}$. The time $T_{SeNB}$ can be determined based on a combined time that it takes the SeNB 1006 to perform such internal processing tasks, transmit data to the user equipment 1002, and/or receive a response from the user equipment 1002, i.e., time to perform a successful transmission. The SeNB 1006 can then also transmit an acknowledgement ("ACK") to the MeNB 1004 that can indicate a successful receipt of the $W_S$ PDCP PDU. The MeNB 1004 can compare $T_{MeNB}$ and $T_{SeNB}$ and make a determination which time smaller. Based on that determination, the eNodeB with the smallest time (i.e., $T_{MeNB}$ or $T_{SeNB}$) can be used for further communication with the user equipment 1002. The MeNB 1004 can also determine a new adaptive PDCP window $W1_S$ based on the comparison of $T_{MeNB}$ and $T_{SeNB}$ and transmit the $W1_S$ PDCP PDU information to the SeNB 1006. This process can be repeated based on updated times $T_{MeNB}$ or $T_{SeNB}$.

In some implementations, the PDCP flow control mechanism discussed above is not limited to the 1A and/or 3C alternatives, discussed above, but can be implemented in any other alternatives. This mechanism can be used to determine how to divide data transmission/processing and/or communications between MeNB and SeNB to provide for improved communications, throughput, quality of service, etc.

Figure 12:
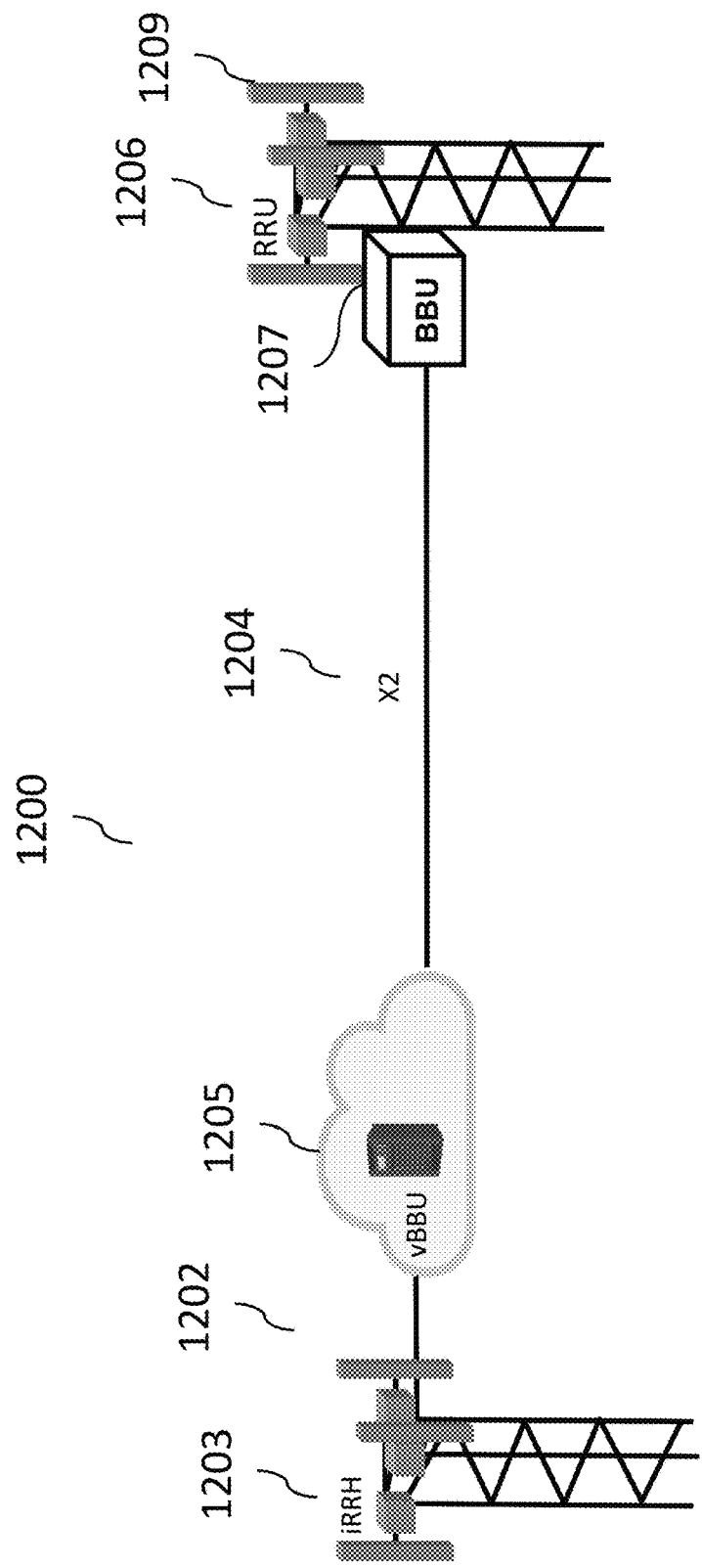
FIG. 12 illustrates an exemplary communications system for determining user equipment capability information, according to some implementations of the current subject matter.

FIG. 12 illustrates an exemplary communications system 1200 for determining user equipment capability information, according to some implementations of the current subject matter. The system 1200 can include a MeNB 1202 communicatively coupled to a SeNB 1206 via an X2 communication interface 1204. The MeNB 1202 can include an iRRH 1203 and a vBBU 1205. The SeNB 1204 can include a BBU 1207 and a RRU 1209. Each MeNB 1202 and SeNB 1204 can also include their own scheduling processors that can perform various processing tasks associated with scheduling of transmissions of data. An exemplary scheduling processor is illustrated in FIG. 13.

Figure 13:
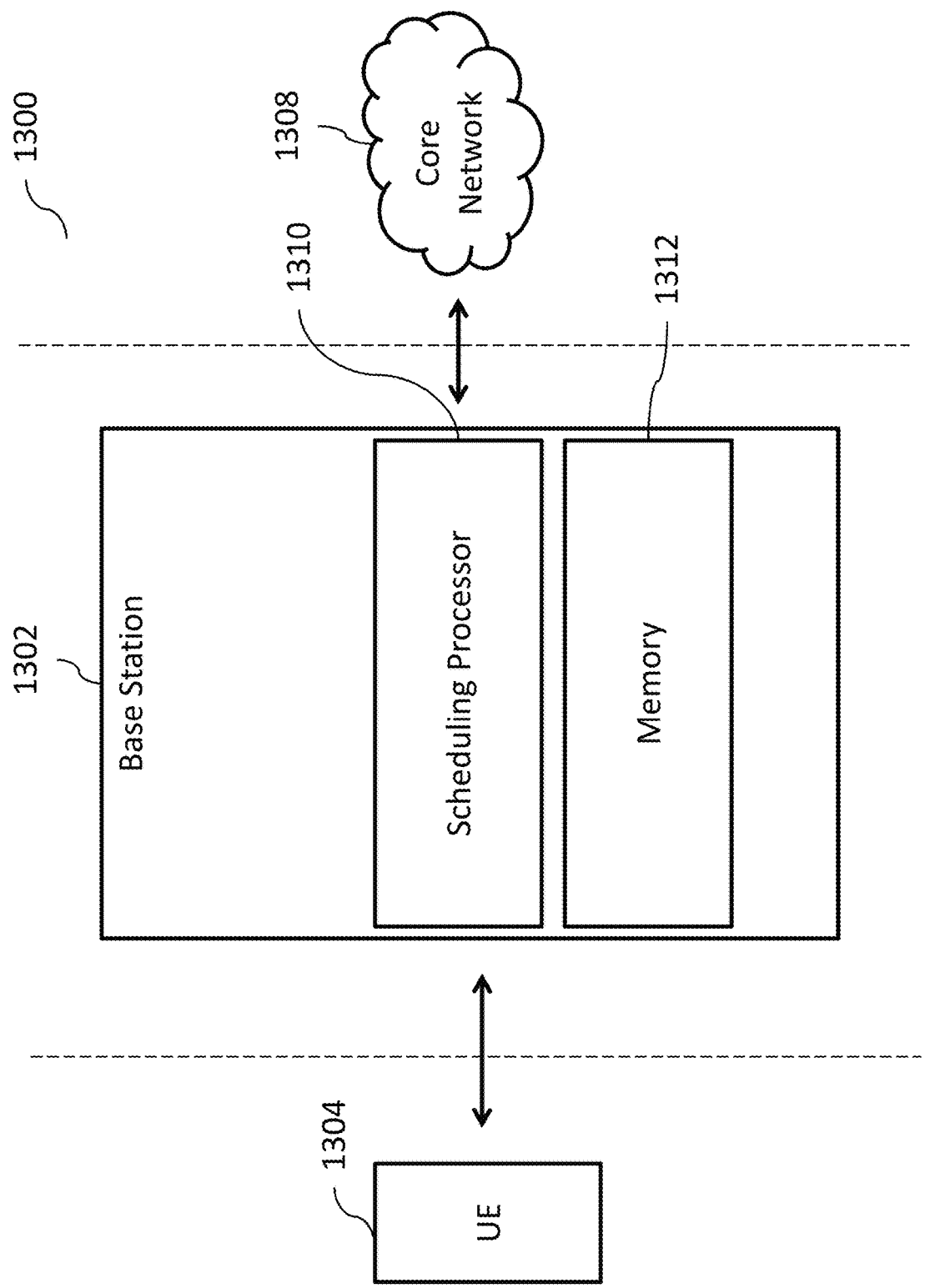
FIG. 13 illustrates an exemplary wireless communications system having a scheduling processor implemented in a base station, according to some implementations of the current subject matter.

FIG. 13 illustrates an exemplary wireless communications system 1300 having a scheduling processor implemented in a base station, according to some implementations of the current subject matter. The system 1300 can include a user equipment 1304, a base station (e.g., an eNodeB) 1306, and a core network 1308. The eNodeB 1306 can correspond to an eNodeB shown and described above with reference to FIG. 3. The eNodeB 1306 can include, among other components, a scheduling processor 1310 and a memory 1312. While shown as separate components in FIG. 13, the scheduling processor 1310 and the memory 1312 (as well as any other components) can be integrated in one or more processing components. In some implementations, the packet scheduling processor 1310 can be provided as a software module in a processor that is specifically programmed to implement the functions described herein with reference to this processor.

The scheduling processor 1310 can assign and/or allocate resource blocks for a particular communication link. Assignment/allocation of resource blocks can be based on predefined settings stored in memory 1312. The resource blocks can be also assigned/allocated based on any other information, which can include information detected through inspection of the data packets, user equipment identification information, channel conditions of the communication link with the user equipment and/or the core network, and/or any other factors.

For example, the scheduling processor 1310 can also take into account the application type (e.g., voice, text, etc.), time of transmission/receipt of data packet, the size of the file associated with the data packet, the provider of the content, the user device type or profile information associated with the user/user equipment, QoS requirements for the data packet and/or user equipment, a channel quality indication ("CQI") determined by the eNodeB 1306, a buffer status report ("BSR") of the eNodeB buffer, a power headroom report ("PHR"), and/or a predefined priority for the content corresponding to the data packet content, and/or any combination thereof.

In some implementations, the scheduling processor 1310 can be provided on in layer 2 of the base station as shown in FIGS. 2 and 3. In those implementations in which functions of layer 2 are subdivided between the iBBU 306 and iRRHs 302, the scheduling processor 1310 can be implemented as part of the layer 2 functions that remain with the iBBU 306 (or vBBU). The scheduling processor 1310 can also be provided on a separate functional layer from the functional layers described with reference to FIGS. 2 and 3. The scheduling processor 1310 can be configured to communicate and coordinate with other functions performed by the base station 1306. In some implementations, the packet scheduling processor 1310 can coordinate with the MAC layer, and in particular, a hybrid automatic repeat request ("HARQ") manager of the MAC layer, as well as, with a physical layer of the base station.

Referring back to FIG. 12, upon connection initiation, user equipment (not shown in FIG. 12) can transmit capability information to the MeNB 1202. The user equipment capability and how it can be split can be determined by the MeNB 1202. The MeNB 1202 can semi-statically partition user equipment capability between master cell group ("MCG", which can be representative of one or more MeNBs) and secondary cell group ("SCG", which can be representative of one or more SeNBs) and to assign a maximum value for each partition. The MeNB 1202 can make this determination based on a number of downlink shared channel ("DL-SCH") transport block bits per TTI and soft bits as well as uplink shared channel ("UL-SCH") transport block bits.

Upon partitioning the user equipment capability, the MeNB 1202 can transmit the partitioned user equipment capability information along with expected user equipment behavior in a form of an activity time to SeNB 1206. The SeNB 1206 can use the activity time received from the MeNB 1202 to improve SeNB 1206 resource allocation. The MeNB 1202 can update partitions of the user equipment capability between MCG and SCG using a modification request that can be transmitted to the SeNB. The update can be determined based on a statistical comparison of $T_{MeNB}$ and $T_{SeNB}$.

Figure 14:
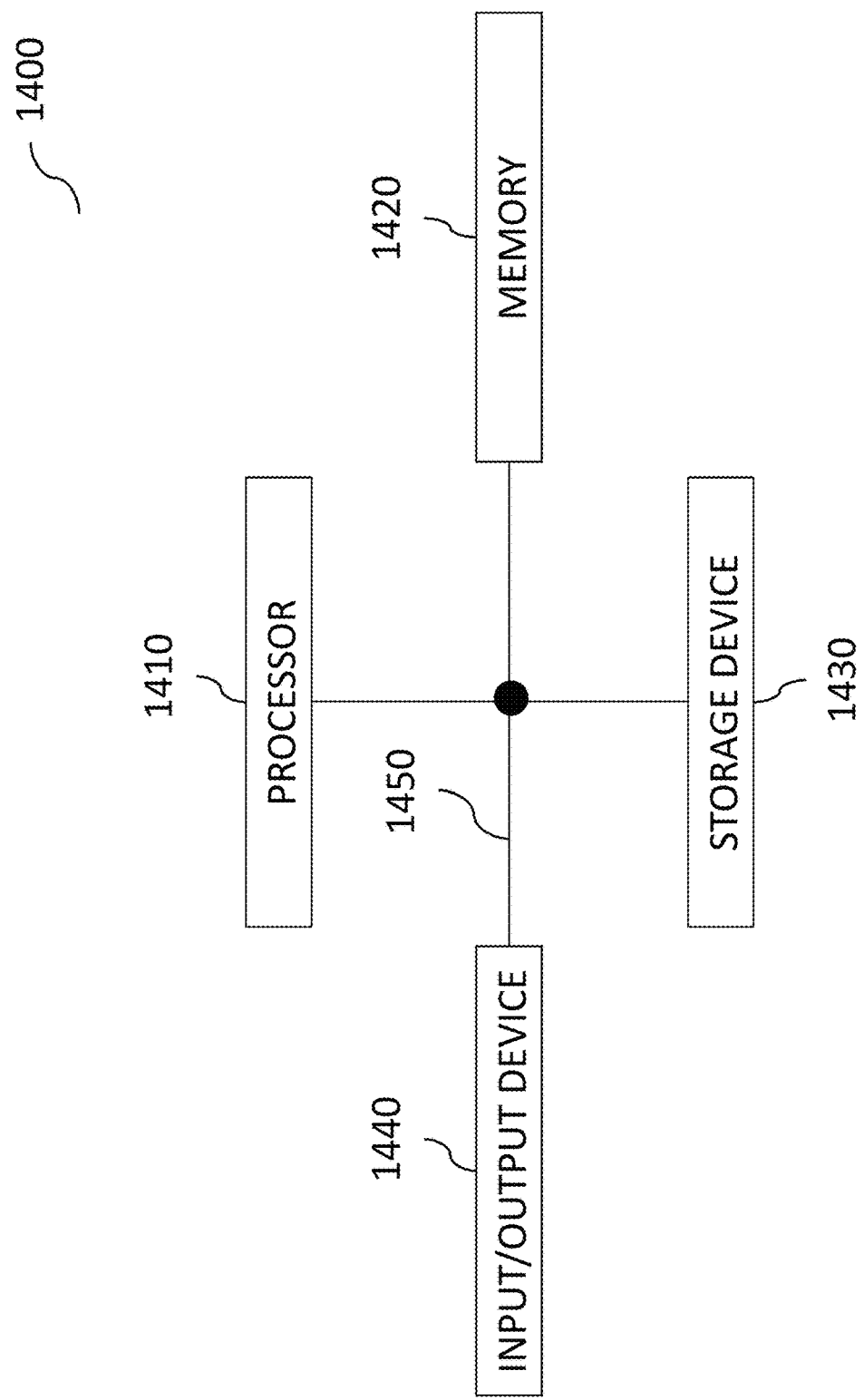
FIG. 14 illustrates an exemplary system, according to some implementations of the current subject matter.

In some implementations, the current subject matter can be configured to be implemented in a system 1400, as shown in FIG. 14. The system 1400 can include one or more of a processor 1410, a memory 1420, a storage device 1430, and an input/output device 1440. Each of the components 1410, 1420, 1430 and 1440 can be interconnected using a system bus 1450. The processor 1410 can be configured to process instructions for execution within the system 1400. In some implementations, the processor 1410 can be a single-threaded processor. In alternate implementations, the processor 1410 can be a multi-threaded processor. The processor 1410 can be further configured to process instructions stored in the memory 1420 or on the storage device 1430, including receiving or sending information through the input/output device 1440. The memory 1420 can store information within the system 1400. In some implementations, the memory 1420 can be a computer-readable medium. In alternate implementations, the memory 1420 can be a volatile memory unit. In yet some implementations, the memory 1420 can be a non-volatile memory unit. The storage device 1430 can be capable of providing mass storage for the system 1400. In some implementations, the storage device 1430 can be a computer-readable medium. In alternate implementations, the storage device 1430 can be a floppy disk device, a hard disk device, an optical disk device, a tape device, non-volatile solid state memory, or any other type of storage device. The input/output device 1440 can be configured to provide input/output operations for the system 1400. In some implementations, the input/output device 1440 can include a keyboard and/or pointing device. In alternate implementations, the input/output device 1440 can include a display unit for displaying graphical user interfaces.

Figure 15:
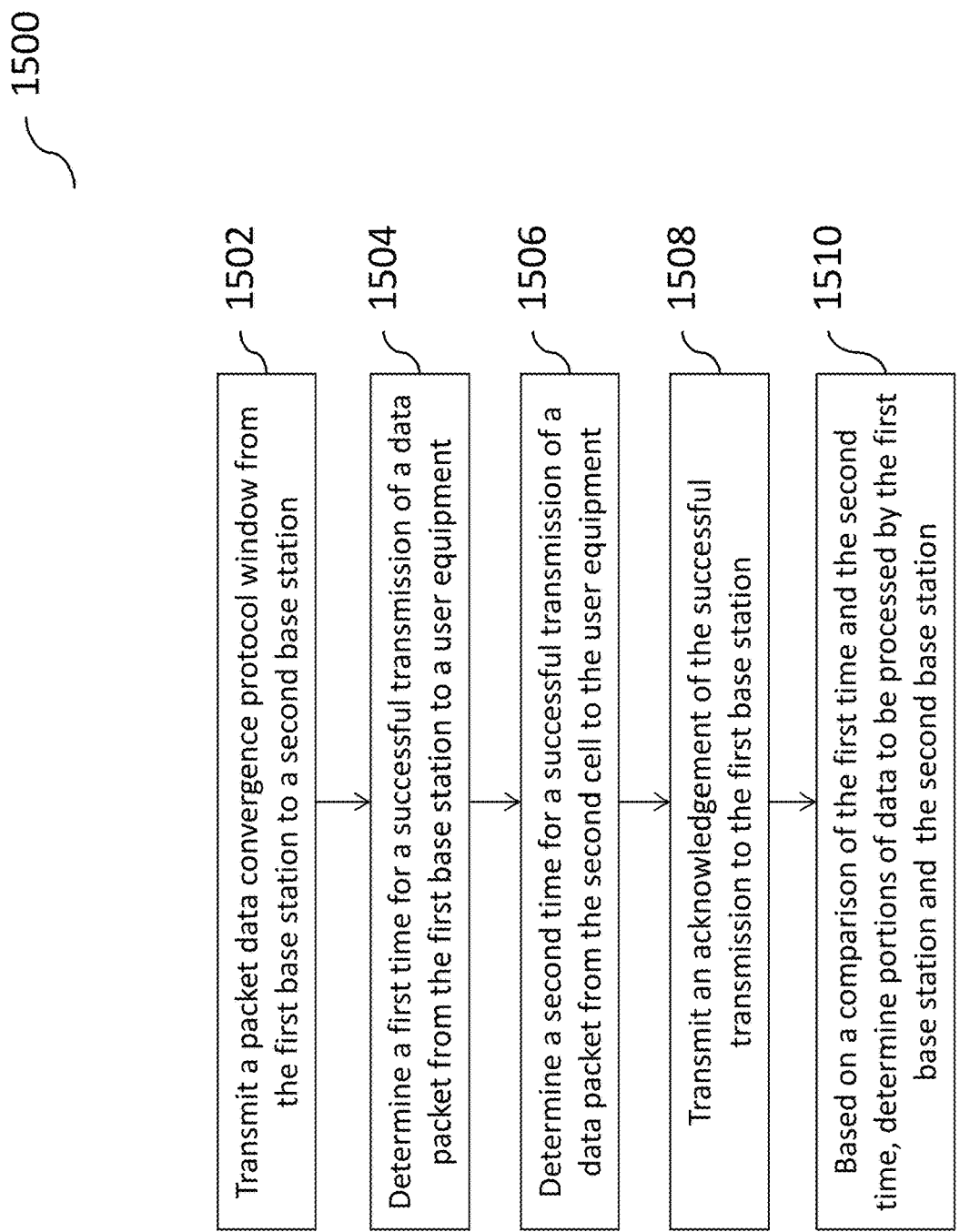
FIG. 15 illustrates an exemplary method, according to some implementations of the current subject matter.

FIG. 15 illustrates an exemplary process 1500 for controlling data flow in wireless communication systems, which can include dual connectivity capabilities, according to some implementations of the current subject matter. At 1502, a packet data convergence protocol ("PDCP") window can be transmitted from a first base station (e.g., a master base station or MeNB) to a second base station (e.g., a secondary base station or SeNB). At 1504, a first time (e.g., $T_{MeNB}$) for successful transmission of a data packet from the first base station to a user equipment can be determined by the first base station. At 1506, upon receipt of the PDCP window, a second time (e.g., $T_{SeNB}$) for successful transmission of a data packet from the second base station to the user equipment can be determined by the second base station. At 1508, the second base station can transmit an acknowledgement of the successful transmission to the first base station. At 1510, based on a comparison of the first and second times, a determination can be made as to portions of data to be processed (or pushed toward) by the first base station and the second base station. For example, based on the comparison of the first and second times, a base station (e.g., a first or a second base station) can be determined to process data (e.g., another data packet). Once determination is made, the data (e.g., another data packet) can be processed by the determined base station.

In some implementations, the current subject matter can include one or more of the following optional features. The first and second base stations can be communicatively coupled using an X2 communication interface. The first time can be determined by the first base station. In some implementations, at least one of the first base station and the second base station can include at least one of the following: an evolved node B having a base band unit and a remote radio head, a virtual baseband unit, and a portion of an evolved node B.

In some implementations, the first base station can be a master base station and the second base station can be a secondary base station. In some implementations, the master base station can include a packet data convergence protocol functionality and can control flow of packet data convergence protocol data between the master base station and the secondary base station. In alternate implementations, the secondary base station can include a packet data convergence protocol functionality and can control flow of packet data convergence protocol data between the master base station and the secondary base station. In yet further implementations, the master base station and the secondary base station can include a packet data convergence protocol functionality. Each of the master base station and the secondary base station can independently control flow of packet data convergence protocol data between the master base station and the secondary base station.

In some implementations, the method can further include determining an updated packet data convergence protocol window based on the comparison of the first time and the second time, transmitting the updated packet data convergence protocol window to the second base station, and processing the at least another data packet based on the updated packet data convergence protocol window.

In some implementations, the method can also include receiving processing capability of the user equipment. The processing capability can be indicative of data packets capable of being processed by the user equipment. The method can then perform partitioning the determined processing capability between the first base station and the second base station, and assigning at least one partition of the processing capability to the first base station and at least another partition of the processing capability to the second base station, and allocating at least one resource block by at least one of the first base station and the second base station to process at least one assigned partition. In some implementations, partitioning can be determined based on a number of downlink shared channel transport block bits per transmission time interval and soft bits, and uplink shared channel transport block bits.

In some implementations, at least one of the first base station and the second base station includes at least one of the following: a macro base station, a micro base station, a femto base station, a pico base station, and any combination thereof.

In some implementations, the user equipment can be configured to receive transmission from the first base station, the second base station, and/or both.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method for transmission of a data packet, comprising:

transmitting a packet data convergence protocol window from a first base station to a second base station;

determining a first time for a successful transmission of a data packet from the first base station to a user equipment, the user equipment being communicatively coupled to at least one of the first base station and the second base station;

receiving an acknowledgement of a successful transmission of the data packet from the second base station to the user equipment, wherein the second base station determines, based on the received packet data convergence protocol window, a second time for the successful transmission of the data packet from the second base station to the user equipment;

determining, based on a comparison of the first time and the second time, a base station to process at least another data packet, wherein the determined base station includes at least one of the first base station and the second base station, and processing the at least another data packet by the determined base station utilizing at least one allocated resource block for processing at least one assigned partition of processing capability of the user equipment;

determining an updated packet data convergence protocol window based on the comparison of the first time and the second time;

transmitting the updated packet data convergence protocol window to the second base station; and processing the at least another data packet based on the updated packet data convergence protocol window;

wherein the first base station being communicatively coupled to a virtual baseband unit having a first portion of a packet data convergence protocol functionality, the first portion determining the base station to process the at least another data packet based on at least a buffer occupancy report received from at least one of the first base station and the second base station.

2. The method according to claim 1, wherein the first and second base stations are communicatively coupled using an X2 communication interface.

3. The method according to claim 1, wherein the first time is determined by the first base station.

4. The method according to claim 1, wherein at least one of the first base station and the second base station include at least one of the following: an evolved node B having a base band unit and a remote radio head, a virtual baseband unit, and a portion of an evolved node B.

5. The method according to claim 1, wherein the first base station is a master base station and the second base station is a secondary base station.

6. The method according to claim 5, wherein the master base station includes the packet data convergence protocol functionality and controls flow of packet data convergence protocol data between the master base station and the secondary base station.

7. The method according to claim 5, wherein the secondary base station includes the packet data convergence protocol functionality and controls flow of packet data convergence protocol data between the master base station and the secondary base station.

8. The method according to claim 5, wherein the master base station and the secondary base station include the packet data convergence protocol functionality, wherein each of the master base station and the secondary base station independently control flow of packet data convergence protocol data between the master base station and the secondary base station.

9. The method according to claim 1, further comprising receiving processing capability of the user equipment, the processing capability being indicative of data packets capable of being processed by the user equipment;

partitioning the determined processing capability between the first base station and the second base station, and assigning at least one partition of the processing capability to the first base station and at least another partition of the processing capability to the second base station; and allocating at least one resource block by at least one of the first base station and the second base station to process at least one assigned partition.

10. The method according to claim 9, wherein the partitioning is determined based on a number of downlink shared channel transport block bits per transmission time interval and soft bits, and uplink shared channel transport block bits.

11. The method according to claim 1, wherein at least one of the first base station and the second base station includes at least one of the following: a macro base station, a micro base station, a femto base station, a pico base station, and any combination thereof.

12. The method according to claim 1, wherein the user equipment is configured to receive transmission from the first base station, the second base station, and/or both.

13. A system comprising:
at least one programmable processor; and
a non-transitory machine-readable medium storing instructions that, when executed by the at least one programmable processor, cause the at least one programmable processor to perform operations comprising:

transmitting a packet data convergence protocol window from a first base station to a second base station;

determining a first time for a successful transmission of a data packet from the first base station to a user equipment, the user equipment being communicatively coupled to at least one of the first base station and the second base station;

receiving an acknowledgement of a successful transmission of the data packet from the second base station to the user equipment, wherein the second base station determines, based on the received packet data convergence protocol window, a second time for the successful transmission of the data packet from the second base station to the user equipment;

determining, based on a comparison of the first time and the second time, a base station to process at least another data packet, wherein the determined base station includes at least one of the first base station and the second base station, and processing the at least another data packet by the determined base station utilizing at least one allocated resource block for processing at least one assigned partition of processing capability of the user equipment;

determining an updated packet data convergence protocol window based on the comparison of the first time and the second time;

transmitting the updated packet data convergence protocol window to the second base station; and processing the at least another data packet based on the updated packet data convergence protocol window;

wherein the first base station being communicatively coupled to a virtual baseband unit having a first portion of a packet data convergence protocol functionality, the first portion determining the base station to process the at least another data packet based on at least a buffer occupancy report received from at least one of the first base station and the second base station.

14. The system according to claim 13, wherein the first and second base stations are communicatively coupled using an X2 communication interface.

15. The system according to claim 13, wherein the first time is determined by the first base station.

16. The system according to claim 13, wherein at least one of the first base station and the second base station include at least one of the following: an evolved node B having a base band unit and a remote radio head, a virtual baseband unit, and a portion of an evolved node B.

17. The system according to claim 13, wherein the first base station is a master base station and the second base station is a secondary base station.

18. The system according to claim 17, wherein the master base station includes the packet data convergence protocol functionality and controls flow of packet data convergence protocol data between the master base station and the secondary base station.

19. The system according to claim 17, wherein the secondary base station includes the packet data convergence protocol functionality and controls flow of packet data convergence protocol data between the master base station and the secondary base station.

20. The system according to claim 17, wherein the master base station and the secondary base station include the packet data convergence protocol functionality, wherein each of the master base station and the secondary base station independently control flow of packet data convergence protocol data between the master base station and the secondary base station.

21. The system according to claim 13, wherein the operations further comprise
receiving processing capability of the user equipment, the processing capability being indicative of data packets capable of being processed by the user equipment;
partitioning the determined processing capability between the first base station and the second base station, and assigning at least one partition of the processing capability to the first base station and at least another partition of the processing capability to the second base station; and
allocating at least one resource block by at least one of the first base station and the second base station to process at least one assigned partition.

22. The system according to claim 21, wherein the partitioning is determined based on a number of downlink shared channel transport block bits per transmission time interval and soft bits, and uplink shared channel transport block bits.

23. The system according to claim 13, wherein at least one of the first base station and the second base station includes at least one of the following: a macro base station, a micro base station, a femto base station, a pico base station, and any combination thereof.

24. The system according to claim 13, wherein the user equipment is configured to receive transmission from the first base station, the second base station, and/or both.

25. A computer program product comprising a non-transitory machine-readable medium storing instructions that, when executed by at least one programmable processor, cause the at least one programmable processor to perform operations comprising:
transmitting a packet data convergence protocol window from a first base station to a second base station;
determining a first time for a successful transmission of a data packet from the first base station to a user equipment, the user equipment being communicatively coupled to at least one of the first base station and the second base station;
receiving an acknowledgement of a successful transmission of the data packet from the second base station to the user equipment, wherein the second base station determines, based on the received packet data convergence protocol window, a second time for the successful transmission of the data packet from the second base station to the user equipment;
determining, based on a comparison of the first time and the second time, a base station to process at least another data packet, wherein the determined base station includes at least one of the first base station and the second base station, and processing the at least another data packet by the determined base station utilizing at least one allocated resource block for processing at least one assigned partition of processing capability of the user equipment;
determining an updated packet data convergence protocol window based on the comparison of the first time and the second time;
transmitting the updated packet data convergence protocol window to the second base station; and
processing the at least another data packet based on the updated packet data convergence protocol window;
wherein the first base station being communicatively coupled to a virtual baseband unit having a first portion of a packet data convergence protocol functionality, the first portion determining the base station to process the at least another data packet based on at least a buffer occupancy report received from at least one of the first base station and the second base station.

26. The computer program product according to claim 25, wherein the first and second base stations are communicatively coupled using an X2 communication interface.

27. The computer program product according to claim 25, wherein the first time is determined by the first base station.

28. The computer program product according to claim 25, wherein at least one of the first base station and the second base station include at least one of the following: an evolved node B having a base band unit and a remote radio head, a virtual baseband unit, and a portion of an evolved node B.

29. The computer program product according to claim 25, wherein the first base station is a master base station and the second base station is a secondary base station.

30. The computer program product according to claim 29, wherein the master base station includes the packet data convergence protocol functionality and controls flow of packet data convergence protocol data between the master base station and the secondary base station.

31. The computer program product according to claim 29, wherein the secondary base station includes the packet data convergence protocol functionality and controls flow of packet data convergence protocol data between the master base station and the secondary base station.

32. The computer program product according to claim 29, wherein the master base station and the secondary base station include the packet data convergence protocol functionality, wherein each of the master base station and the secondary base station independently control flow of packet data convergence protocol data between the master base station and the secondary base station.

33. The computer program product according to claim 25, wherein the operations further comprise receiving processing capability of the user equipment, the processing capability being indicative of data packets capable of being processed by the user equipment;

partitioning the determined processing capability between the first base station and the second base station, and assigning at least one partition of the processing capability to the first base station and at least another partition of the processing capability to the second base station; and allocating at least one resource block by at least one of the first base station and the second base station to process at least one assigned partition.

34. The computer program product according to claim 33, wherein the partitioning is determined based on a number of downlink shared channel transport block bits per transmission time interval and soft bits, and uplink shared channel transport block bits.

35. The computer program product according to claim 25, wherein at least one of the first base station and the second base station includes at least one of the following: a macro base station, a micro base station, a femto base station, a pico base station, and any combination thereof.

36. The computer program product according to claim 25, wherein the user equipment is configured to receive transmission from the first base station, the second base station, and/or both.

* * * * *